US010796362B2

(12) United States Patent
Seergy et al.

(10) Patent No.: US 10,796,362 B2
(45) Date of Patent: *Oct. 6, 2020

(54) USED AUTOMOBILE TRANSACTION FACILITATION FOR A SPECIFIC USED AUTOMOBILE

(71) Applicant: Sidekick Technology LLC, Pine Brook, NJ (US)

(72) Inventors: Michael J. Seergy, Pine Brook, NJ (US); Benjamin N. S. Brown, Pine Brook, NJ (US)

(73) Assignee: SIDEKICK TECHNOLOGY LLC, Pine Brook, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,078

(22) Filed: Nov. 26, 2018

(65) Prior Publication Data

US 2019/0095987 A1 Mar. 28, 2019

Related U.S. Application Data

(63) Continuation of application No. 15/284,181, filed on Oct. 3, 2016, now Pat. No. 10,140,655, which is a (Continued)

(51) Int. Cl.
*G06Q 30/00* (2012.01)
*G06Q 30/08* (2012.01)
(Continued)

(52) U.S. Cl.
CPC ............ *G06Q 30/08* (2013.01); *G01C 21/34* (2013.01); *G01C 21/3679* (2013.01);
(Continued)

(58) Field of Classification Search
CPC ................. G06Q 30/0601–0645; G06Q 30/80
(Continued)

(56) References Cited

U.S. PATENT DOCUMENTS 5,970,472 A 10/1999 Allsop et al.
6,006,201 A 12/1999 Berent et al.
(Continued)

OTHER PUBLICATIONS

AutoTrader.com, Inc..: Private Company Information—Business Week, http:///investing.businessweek.com/research/stocks/private/snapshot.asp?privcapId=92642.
(Continued)

*Primary Examiner* — Brandy A Zukanovich
(74) *Attorney, Agent, or Firm* — K&L Gates LLP

(57) ABSTRACT

A system, methods, and apparatus for performing used automobile transactions are disclosed. In an example embodiment, automobile market data representative of current automobile market characteristics is stored. The automobile market data may include pricing and consumer interest information received from consumers, dealers, and manufacturers. A consumer seller or manufacturer off-lease seller may provide a request for a response regarding a specific used automobile with a specific a vehicle identification number. Automobile market data may be provided to a used automobile buyer based on the request. Bids to purchase the specific used automobile may be requested from used automobile buyers based on the request. Buyer bids may be provided to the consumer seller or manufacturer off-lease seller with prices and a delivery options. The consumer seller or manufacturer off-lease seller may select a bid to sell the specific used automobile based on the bid.

63 Claims, 7 Drawing Sheets

Related U.S. Application Data continuation of application No. 14/841,157, filed on Aug. 31, 2015, now Pat. No. 9,460,467, which is a continuation of application No. 14/176,700, filed on Feb. 10, 2014, now Pat. No. 9,123,075, which is a continuation of application No. 13/207,858, filed on Aug. 11, 2011, now Pat. No. 8,650,093, which is a continuation-in-part of application No. 13/176,497, filed on Jul. 5, 2011, now Pat. No. 9,141,984, and a continuation-in-part of application No. 13/176,525, filed on Jul. 5, 2011, now Pat. No. 8,744,925.

(51) Int. Cl.
*G06Q 30/06* (2012.01)
*G01C 21/34* (2006.01)
*G01C 21/36* (2006.01)
*G06F 3/16* (2006.01)
*H04W 4/021* (2018.01)

(52) U.S. Cl.
CPC ......... *G01C 21/3697* (2013.01); *G06F 3/167* (2013.01); *G06Q 30/06* (2013.01); *G06Q 30/0641* (2013.01); *H04W 4/021* (2013.01); *H05K 999/99* (2013.01)

(58) Field of Classification Search
USPC ..... 705/26.1, 26.2, 26.25, 26.3, 26.35, 26.4,
705/26.41, 26.42, 26.43, 26.44, 26.5,
705/26.6, 26.61, 26.62, 26.63, 26.64,
705/26.7, 26.8, 26.81, 26.82, 26.9, 27.1,
705/27.2
See application file for complete search history.

(56) References Cited

U.S. PATENT DOCUMENTS

| | | |
|---|---|---|
| 6,321,221 B1 | 11/2001 | Bieganski |
| 6,463,431 B1 | 10/2002 | Schmitt |
| 6,533,173 B2 | 3/2003 | Benyak |
| 6,868,388 B1 | 3/2005 | Millsap et al. |
| 6,868,389 B1 | 3/2005 | Wilkins et al. |
| 7,395,223 B1 | 7/2008 | Buzzell et al. |
| 7,406,436 B1 | 7/2008 | Reisman |
| 7,479,949 B2 | 1/2009 | Jobs et al. |
| 7,636,574 B2 | 12/2009 | Poosala |
| 8,160,929 B1 | 4/2012 | Park et al. |
| 8,392,193 B2 | 3/2013 | Schultz et al. |
| 8,606,604 B1 | 12/2013 | Huber et al. |
| 2002/0065707 A1 | 5/2002 | Lancaster et al. |
| 2002/0082978 A1 | 6/2002 | Ghouri et al. |
| 2002/0099628 A1 | 7/2002 | Takaoka et al. |
| 2002/0111877 A1 | 8/2002 | Nelson |
| 2002/0128946 A1 | 9/2002 | Chehade et al. |
| 2003/0088435 A1 | 5/2003 | King |
| 2003/0200151 A1 | 10/2003 | Ellenson |
| 2003/0229577 A1 | 12/2003 | Nabel |
| 2004/0034544 A1 | 2/2004 | Fields et al. |
| 2004/0059626 A1 | 3/2004 | Smallwood |
| 2005/0004819 A1 | 1/2005 | Etzioni et al. |
| 2005/0050097 A1 | 3/2005 | Yeh et al. |
| 2005/0108112 A1 | 5/2005 | Ellenson et al. |
| 2005/0240512 A1 | 10/2005 | Quintero et al. |
| 2006/0020477 A1 | 1/2006 | Retzbach et al. |
| 2007/0150362 A1 | 6/2007 | Sharma et al. |
| 2007/0250403 A1 | 10/2007 | Altschuler |
| 2007/0255663 A1 | 11/2007 | Jordan et al. |
| 2007/0260526 A1 | 11/2007 | Bartel |
| 2008/0046331 A1 | 2/2008 | Rand |
| 2008/0177653 A1 | 7/2008 | Famolari et al. |
| 2008/0183552 A1 | 7/2008 | O'Hagan |
| 2008/0187125 A1 | 8/2008 | Siegrist |
| 2008/0201184 A1 | 8/2008 | Rose et al. |
| 2008/0201188 A1 | 8/2008 | Heyman et al. |
| 2008/0201203 A1 | 8/2008 | Rose et al. |
| 2008/0208731 A1 | 8/2008 | Ruckart |
| 2008/0228657 A1 | 9/2008 | Nabors et al. |
| 2009/0076896 A1 | 3/2009 | DeWitt et al. |
| 2009/0132348 A1 | 5/2009 | Bria et al. |
| 2009/0149199 A1 | 6/2009 | Maghoul |
| 2009/0171761 A1 | 7/2009 | Noy et al. |
| 2009/0187478 A1 | 7/2009 | Shipley |
| 2009/0187513 A1 | 7/2009 | Noy et al. |
| 2009/0198557 A1 | 8/2009 | Wang et al. |
| 2009/0204600 A1 | 8/2009 | Kalik et al. |
| 2010/0048242 A1 | 2/2010 | Rhoads et al. |
| 2010/0106580 A1 | 4/2010 | Etheredge et al. |
| 2010/0217525 A1 | 8/2010 | King et al. |
| 2010/0274627 A1 | 10/2010 | Carlson |
| 2010/0332292 A1 | 12/2010 | Anderson |
| 2011/0040642 A1 | 2/2011 | O'Dell |
| 2011/0082759 A1 | 4/2011 | Swinson et al. |
| 2011/0087430 A1 | 4/2011 | Boss et al. |
| 2011/0087556 A1 | 4/2011 | Pitkow |
| 2011/0099036 A1 | 4/2011 | Sarkissian et al. |
| 2011/0208418 A1 | 8/2011 | Looney et al. |
| 2011/0238474 A1 | 9/2011 | Carr et al. |
| 2011/0238514 A1 | 9/2011 | Ramalingam et al. |
| 2011/0276394 A1 | 11/2011 | Chan |

OTHER PUBLICATIONS

Autotrader.com Introduces IPhone App to Create a More Personalized "PC-to-Pocket" Experience for Car Shoppers, http://www.prnewswire.com/news-releases/autotradercom, Jul. 7, 2011.
AppStore—AutoTrader.com, http://itunes.apple.com/us/app/autotrader-com/id444552888?mt=8, Oct. 31, 2011.
International Search Report dated Sep. 21, 2012 for Intl. Appln. No. PCT/US2012/045546.
Charlton, Auto Trader: iPhone app review. Mar. 15, 2010 [retrieved on Sep. 6, 2012] from the internet: http://www.econsultancy.com/us/blog/5593-auto-trader-iphone-app-review> entire document.
Autodraderuk. Introducing the Auto Trader iPhone App. Mar. 12, 2010 [retrieved on Sep. 6, 2012] from the internet: http://www.youtube.com/watch?v+6g_1g81RG4&fature=player_embedded>entire document.
International Search Report dated Oct. 5, 2012 for Intl. Appln. No. PCT/US2012/045545.
Anonymous, "instaVIN to offer free auto accident history reports for mobile phones," Wireless News, Jun. 2, 2010.

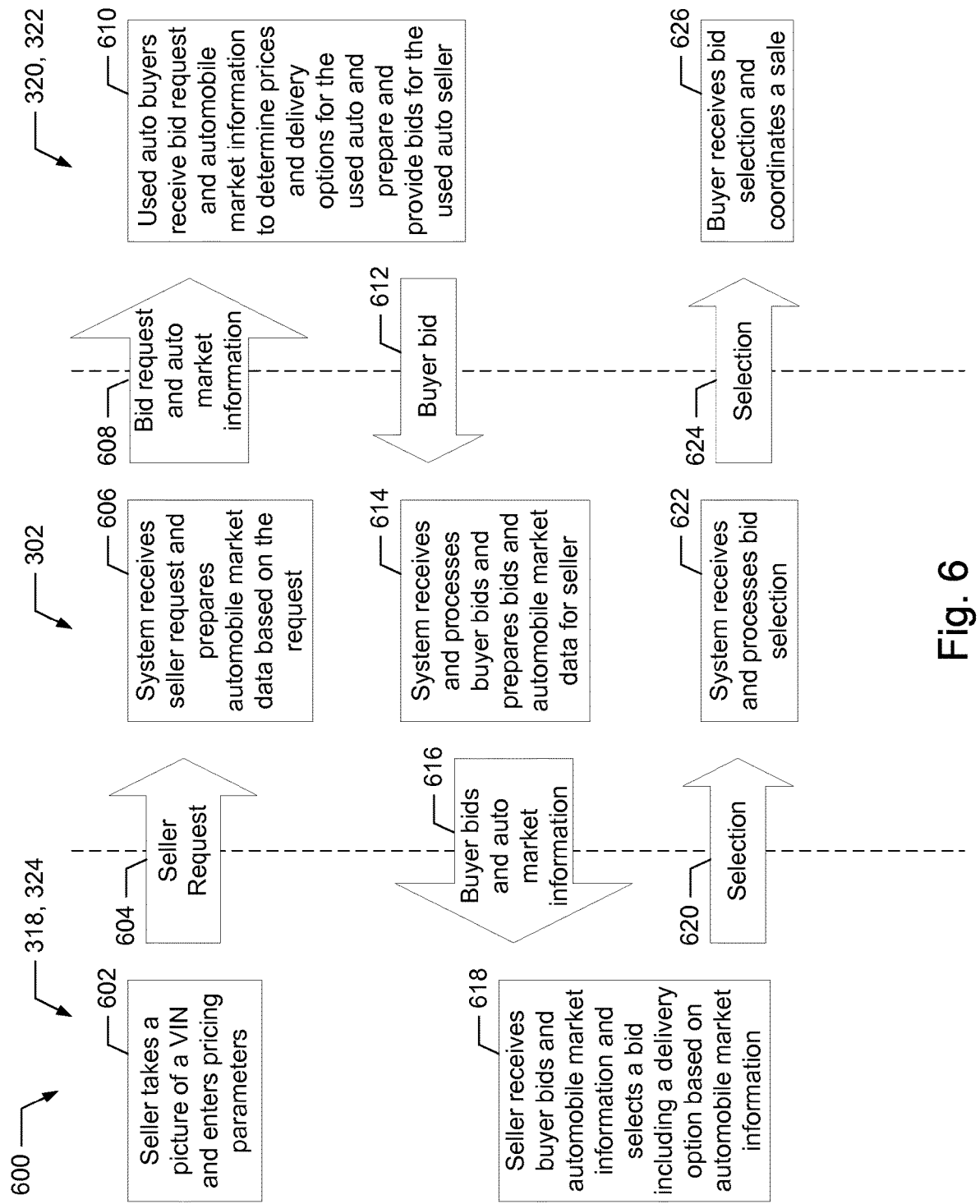

USED AUTOMOBILE TRANSACTION FACILITATION FOR A SPECIFIC USED AUTOMOBILE

CROSS REFERENCE TO RELATED APPLICATIONS AND PRIORITY CLAIM

This application is a continuation of U.S. patent application Ser. No. 15/284,181, filed on Oct. 3, 2016, which a continuation of Ser. No. 14/841,157, filed Aug. 31, 2015, which is a continuation of Ser. No. 14/176,700, filed Feb. 10, 2014, which is a continuation of U.S. patent application Ser. No. 13/207,858, filed on Aug. 11, 2011, which is a continuation-in-part of the following co-pending commonly-owned patent applications filed on Jul. 5, 2011, entitled "AUTOMOBILE TRANSACTION FACILITATION USING A MANUFACTURER RESPONSE," application Ser. No. 13/176,497, and entitled "AUTOMOBILE TRANSACTION FACILITATION BASED ON CUSTOMER SELECTION OF A SPECIFIC AUTOMOBILE," application Ser. No. 13/176,525, now U.S. Pat. No. 8,744,925, issued Jun. 3, 2014, the entire content of each of which is incorporated by reference herein.

BACKGROUND

In the used automobile market, consumers typically sell or trade in used automobiles to dealers or dealerships, or privately sell to other consumers, for example, through personal advertisements. Dealers often purchase used automobiles from consumers as part of a deal for a new automobile, typically referred to as a trade in. Typically, a description of a used automobile in a personal advertisement may include the make, model, and mileage of an automobile, but certain other relevant descriptive information may not be available to a potential buyer. Further, a dealer making a trade in offer for a used automobile may not have certain relevant descriptive information on that used automobile. In many cases, the negotiation process for a used automobile may include a large degree of uncertainty for consumers, including both a selling consumer and a purchasing consumer. A consumer seller may be particularly disadvantaged when negotiating with a dealer for a trade in value, as dealers typically have great knowledge and experience with the process, while consumers typically do not. Generally, the negotiation process is a zero sum process, and because a consumer seller of a used automobile and a used automobile buyer are each trying to get a better deal, there is typically some lack of trust during the negotiation. Accordingly, used automobile buyers and sellers, including consumers and dealers, often base the negotiations on established market prices. However, market prices can fluctuate rapidly depending a variety of factors. For example, consumer demand may be affected by economic factors, such as changes in gasoline prices, unemployment rates, government sponsored tax rebates for automobile purchases, etc.

In many cases, a consumer seller of a used automobile may have concerns that a buyer may not offer a fair and competitive price. Various products and services have become available that allow sellers and buyers, including consumers and dealers, to perform research on market prices for used automobiles. Typically, the highest possible value available to a consumer seller may be through a sale to another consumer, as opposed to trading in the used automobile to a dealer.

In addition to consumers and dealers, automobile manufacturers may also have an interest in the resale values of used automobiles. Further, in many cases, a manufacturer may want to sell used off-lease automobiles which have been returned by consumer lessees. In many cases, a manufacturer off-lease seller may not be able to receive the full market value of a used off-lease automobile.

SUMMARY

The present disclosure provides a new and innovative system, methods and apparatus for providing automobile market information and facilitating used automobile transactions. In an example embodiment, automobile market data representative of current automobile market characteristics is stored. The automobile market data may include pricing and consumer interest information received from consumers, dealers, and manufacturers. A consumer seller or manufacturer off-lease seller may provide a request for a response regarding a specific used automobile with a specific a vehicle identification number. Automobile market data may be provided to a used automobile buyer based on the request. Bids to purchase the specific used automobile may be requested from used automobile buyers based on the request. Buyer bids may be provided to the consumer seller or manufacturer off-lease seller with prices and a delivery options. The consumer seller or manufacturer off-lease seller may select a bid to sell the specific used automobile based on the bid.

Additional features and advantages of the disclosed method and apparatus are described in, and will be apparent from, the following Detailed Description and the Figures.

BRIEF DESCRIPTION OF THE FIGURES

FIG. 6 is flow diagram illustrating an example process for facilitating a used automobile transaction, according to an example embodiment of the present invention.

DETAILED DESCRIPTION OF EXAMPLE EMBODIMENTS

The present disclosure relates in general to a system for facilitating used automobile transactions and, in particular, to an automobile transaction for a specific used automobile. Briefly, in an example embodiment, a system is provided which allows a consumer seller or a manufacturer off-lease seller of a used automobile to request bids and information regarding a specific automobile identified with a specific vehicle identification number. For example, a consumer may use a mobile device to take a picture of a vehicle identification number and may enter a desired price range or minimum asking price. The specific automobile may be identified using optical character recognition to provide, for example, a full list of the original manufacturer features and options, and the original manufacturer suggested retail price and invoice information, for that specific used automobile based on the vehicle identification number. Accordingly, the consumer seller need not enter all of this information, but may request bids and information in real-time for that specific used automobile. Used automobile buyers may include consumers and/or dealers which may provide bids based on the consumer seller request using real-time automobile market information. A consumer seller may select a buyer bid to sell a used automobile based on the prices and delivery options available. Accordingly, typically unavailable or difficult to obtain data may be provided for offering a used automobile for sale, including a full listing of the manufacturer features and options, EPA mileage, safety ratings, recalls, quality reports, estimated insurance costs, etc. In an example embodiment, a manufacturer off-lease seller may select a buyer bid based on the prices and delivery options to maximize value, for example, by reducing costs typically associated with selling an off-lease automobile. The used automobile market is presently approximately three times the size of the new automobile market in the United States, as approximately 40 million used automobiles are sold each year. Accordingly, the present disclosure may be helpful for facilitating large numbers of used automobile transactions. In an example embodiment, the disclosed system matches seller and buyer parameters, such as price and pickup location, to facilitate a live bidding process, which allows a used automobile seller to accept or reject bids using a great deal of information not typically available. In a non-limiting example embodiment, certain features disclosed in the present patent application may be commercially embodied in products and services offered by Sidekick Technology LLC, the assignee of the present application.

Figure 1:
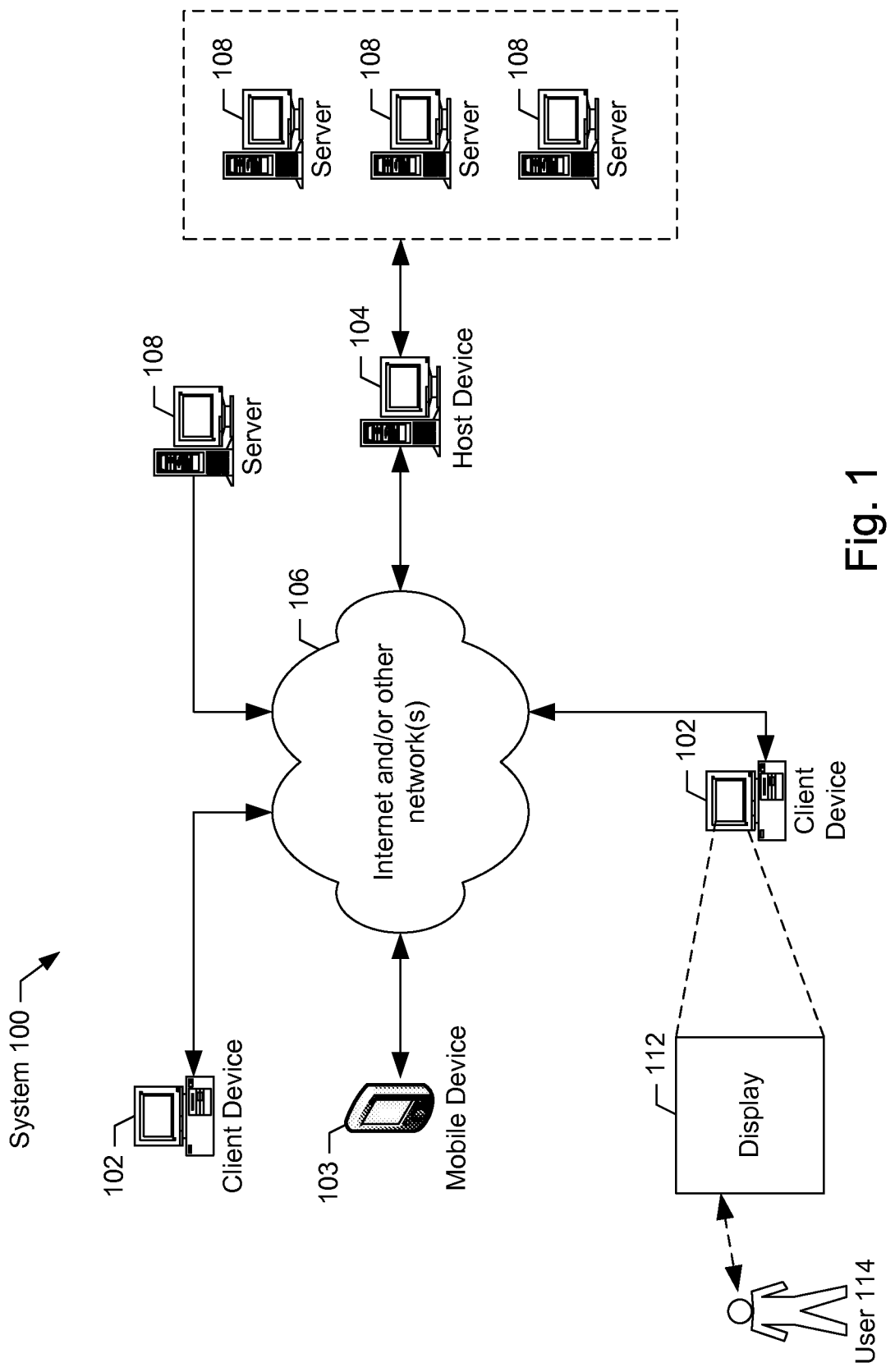
FIG. 1 is a high level block diagram of an example network communicating system, according to an example embodiment of the present invention.

The present system may be readily realized in a network communications system. A high level block diagram of an example network communications system 100 is illustrated in FIG. 1. The illustrated system 100 includes one or more client devices 102, and one or more host devices 104. The system 100 may include a variety of client devices 102, such as desktop computers and the like, which typically include a display 112, which is a user display for providing information to users 114, and various interface elements as will be discussed in further detail below. A client device 102 may be a mobile device 103, which may be a cellular phone, a personal digital assistant, a laptop computer, a tablet computer, etc. The client devices 102 may communicate with the host device 104 via a connection to one or more communications channels 106 such as the Internet or some other data network, including, but not limited to, any suitable wide area network or local area network. It should be appreciated that any of the devices described herein may be directly connected to each other instead of over a network. Typically, one or more servers 108 may be part of the network communications system 100, and may communicate with host servers 104 and client devices 102.

One host device 104 may interact with a large number of users 114 at a plurality of different client devices 102. Accordingly, each host device 104 is typically a high end computer with a large storage capacity, one or more fast microprocessors, and one or more high speed network connections. Conversely, relative to a typical host device 104, each client device 102 typically includes less storage capacity, a single microprocessor, and a single network connection. It should be appreciated that a user 114 as described herein may include any person or entity which uses the presently disclosed system and may include a wide variety of parties. For example, as will be discussed in further detail below, users 114 of the presently disclosed system may include a consumer, a dealer, and/or a manufacturer.

Typically, host devices 104 and servers 108 store one or more of a plurality of files, programs, databases, and/or web pages in one or more memories for use by the client devices 102, and/or other host devices 104 or servers 108. A host device 104 or server 108 may be configured according to its particular operating system, applications, memory, hardware, etc., and may provide various options for managing the execution of the programs and applications, as well as various administrative tasks. A host device 104 or server may interact via one or more networks with one or more other host devices 104 or servers 108, which may be operated independently. For example, host devices 104 and servers 108 operated by a separate and distinct entities may interact together according to some agreed upon protocol.

Figure 2:
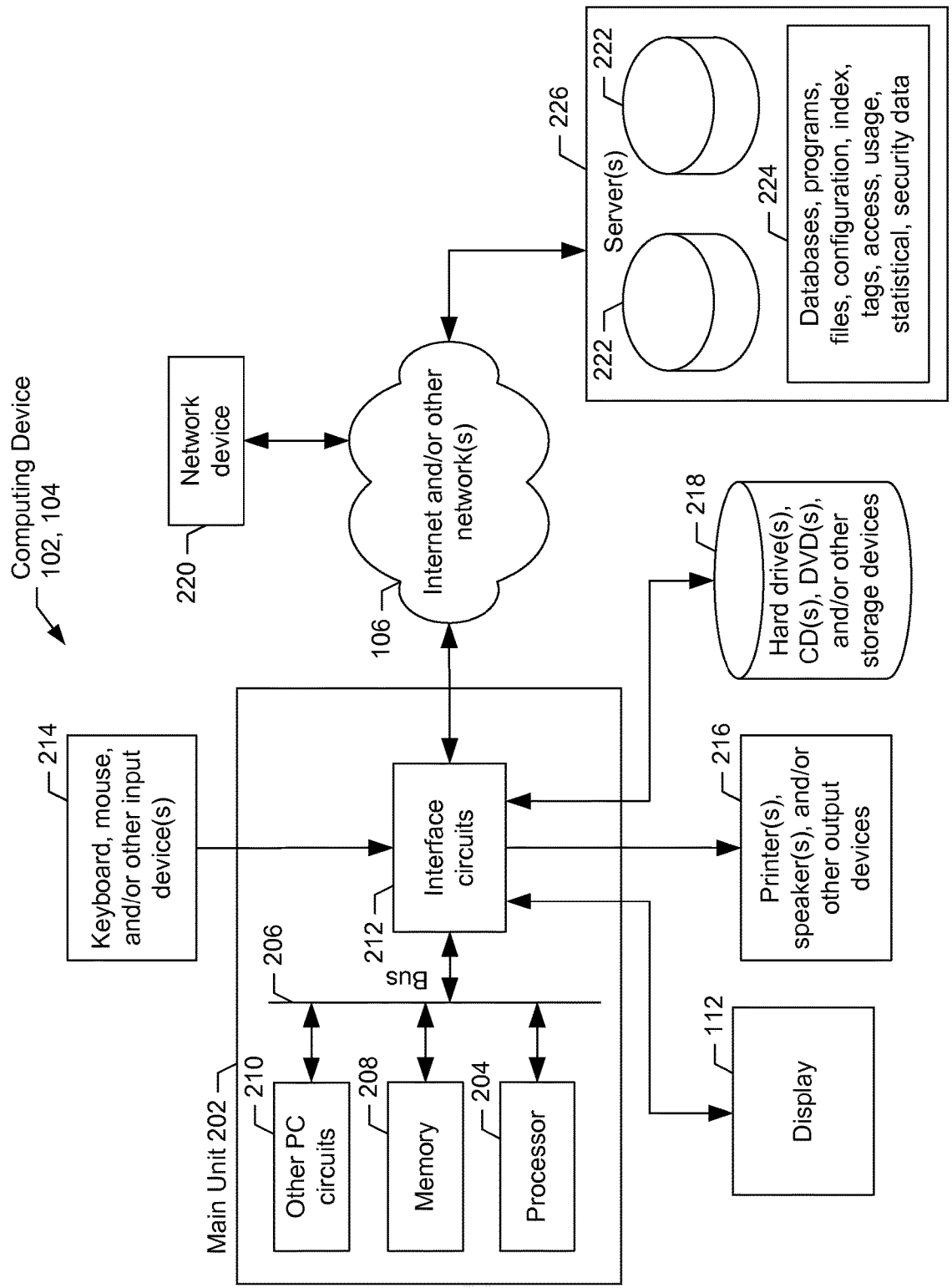
FIG. 2 is a detailed block diagram showing an example of a computing device, according to an example embodiment of the present invention.

A detailed block diagram of the electrical systems of an example computing device (e.g., a client device 102, and a host device 104) is illustrated in FIG. 2. In this example, the computing device 102, 104 includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with the other devices in the system 100 as described below. This program may be executed by the processor 204 in any suitable manner. In an example embodiment, memory 208 may be part of a "cloud" such that cloud computing may be utilized by a computing devices 102, 104. The memory 208 may also store digital data indicative of documents, files, programs, web pages, etc. retrieved from a computing device 102, 104 and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, image sensor, character recognition, barcode scanner, microphone, and/or a speech/voice recognition system.

One or more displays 112, printers, speakers, and/or other output devices 216 may also be connected to the main unit 202 via the interface circuit 212. The display 112 may be a cathode ray tube (CRTs), a liquid crystal display (LCD), or any other type of display. The display 112 generates visual displays generated during operation of the computing device 102, 104. For example, the display 112 may provide a user interface, which will be described in further detail below, and may display one or more web pages received from a computing device 102, 104. A user interface may include prompts for human input from a user 114 including links, buttons, tabs, checkboxes, thumbnails, text fields, drop down boxes, etc., and may provide various outputs in response to the user inputs, such as text, still images, videos, audio, and animations.

One or more storage devices 218 may also be connected to the main unit 202 via the interface circuit 212. For example, a hard drive, CD drive, DVD drive, and/or other storage devices may be connected to the main unit 202. The storage devices 218 may store any type of data, such as pricing data, transaction data, operations data, inventory data, commission data, manufacturing data, image data, video data, audio data, tagging data, historical access or usage data, statistical data, security data, etc., which may be used by the computing device 102, 104.

The computing device 102, 104 may also exchange data with other network devices 220 via a connection to the network 106. Network devices 220 may include one or more servers 226, which may be used to store certain types of data, and particularly large volumes of data which may be stored in one or more data repository 222. A server 226 may include any kind of data 224 including databases, programs, files, libraries, pricing data, transaction data, operations data, inventory data, commission data, manufacturing data, configuration data, index or tagging data, historical access or usage data, statistical data, security data, etc. A server 226 may store and operate various applications relating to receiving, transmitting, processing, and storing the large volumes of data. It should be appreciated that various configurations of one or more servers 226 may be used to support and maintain the system 100. For example, servers 226 may be operated by various different entities, including automobile manufacturers, brokerage services, automobile information services, etc. Also, certain data may be stored in a client device 102 which is also stored on the server 226, either temporarily or permanently, for example in memory 208 or storage device 218. The network connection may be any type of network connection, such as an Ethernet connection, digital subscriber line (DSL), telephone line, coaxial cable, wireless connection, etc.

Access to a computing device 102, 104 can be controlled by appropriate security software or security measures. An individual users' 114 access can be defined by the computing device 102, 104 and limited to certain data and/or actions. Accordingly, users 114 of the system 100 may be required to register with one or more computing devices 102, 104. For example, registered users 114 may be able to request or manipulate data, such as submitting requests for pricing information or providing an offer or a bid.

As noted previously, various options for managing data located within the computing device 102, 104 and/or in a server 226 may be implemented. A management system may manage security of data and accomplish various tasks such as facilitating a data backup process. A management system may be implemented in a client 102, a host device 104, and a server 226. The management system may update, store, and back up data locally and/or remotely. A management system may remotely store data using any suitable method of data transmission, such as via the Internet and/or other networks 106.

Figure 3A:
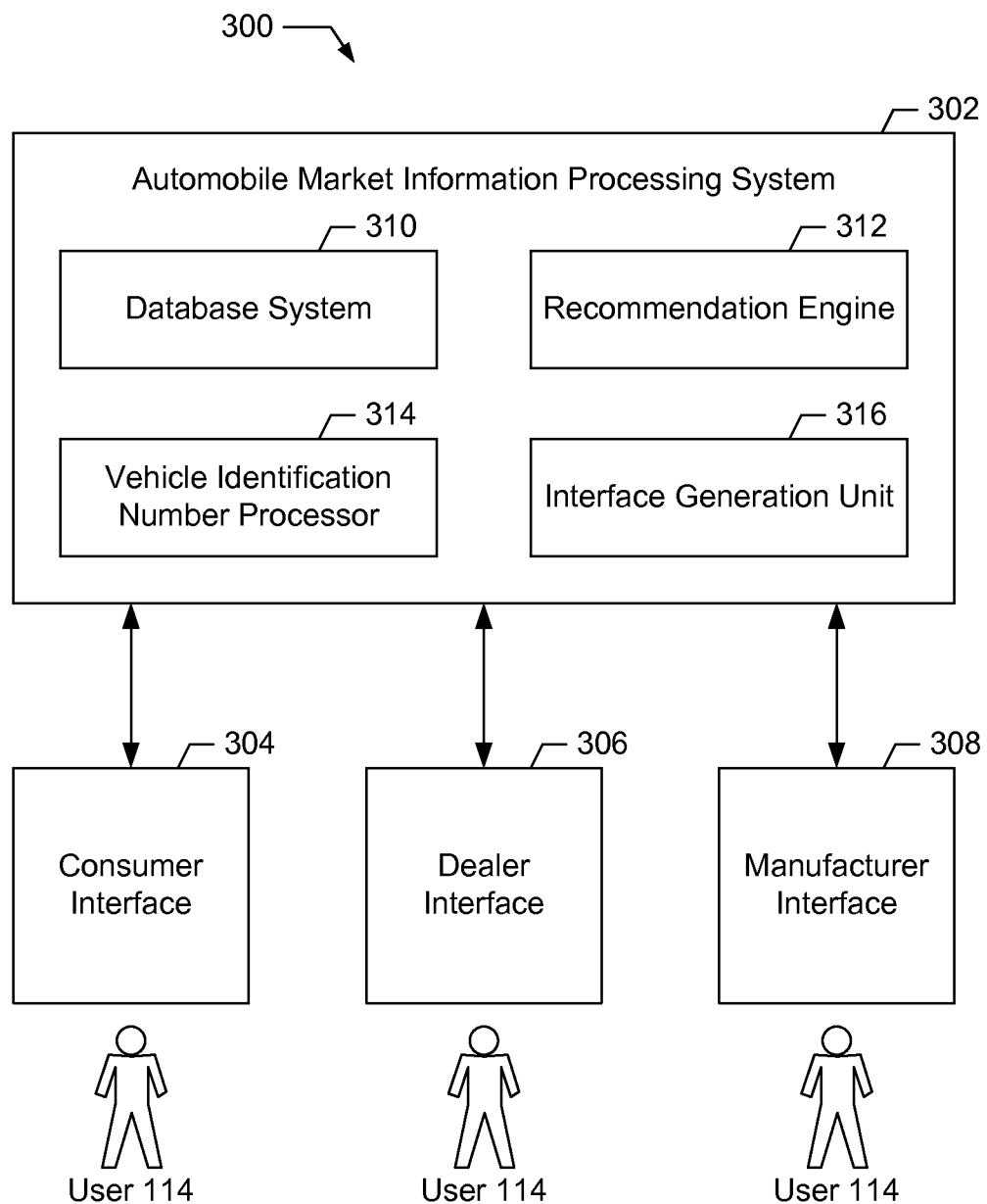
FIGS. 3A and 3B provide a block diagram, each showing an example automobile transaction network structure, according to an example embodiment of the present invention.
Figure 3B:
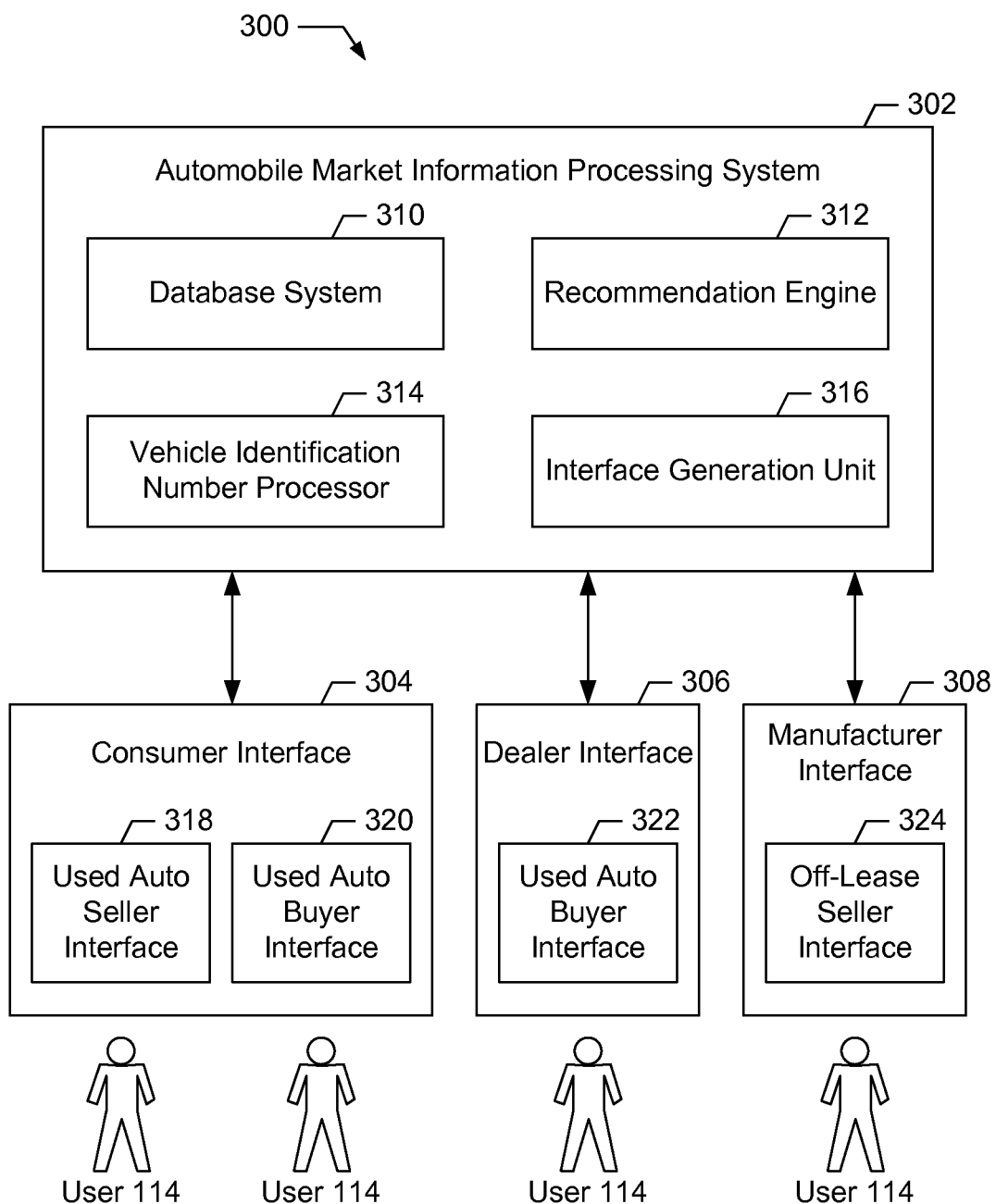

FIGS. 3A and 3B provide block diagrams, each showing an example automobile transaction network structure 300. As illustrated in FIG. 3A, the example automobile transaction network structure 300 includes an automobile market information processing system 302, a consumer interface 304, a dealer interface 306, and a manufacturer interface 308. The example automobile market information processing system 302 may be implemented on one or more host devices 104 accessing one or more servers 108, 226. In an example embodiment, the automobile market information processing system 302 includes a database system 310, a recommendation engine 312, a vehicle identification number processor 314, and an interface generation unit 316. A user 114 may be a consumer, a dealer, or a manufacturer that interacts with the consumer interface 304, dealer interface 306, or manufacturer interface 308, respectively. A database system 310 may include a wide variety of automobile market data. A recommendation engine 312 may provide recommendations for consumers, dealers, and manufacturers. A vehicle identification number processor 314 may be used for making requests regarding specific automobiles and automobiles with specific sets of features. For example, a vehicle identification number processor 314 may determine a specific set of features that a specific car has based on a picture of that specific car's vehicle identification number. Interface generation unit 316 may provide, for example, HTML files which are used at the consumer interface 304, dealer interface 306, and manufacturer interface 308 interface to provide information to the users 114. It should be appreciated that he the consumer interface 304, dealer interface 306, and manufacturer interface 308 may be considered to be part of the automobile market information processing system 302, however, for discussion purposes, the consumer interface 304, dealer interface 306, and manufacturer interface 308 may be referred to as separate from the automobile market information processing system 302.

For example, a user 114 may interact with a consumer interface 304 to research new or used automobiles the user 114 is interested in buying and/or selling. For example, a consumer may be looking for a four door sedan with specific features, including a global positioning system (GPS), a sunroof, tinted windows, rated for at least thirty miles per gallon, four wheel drive, etc. The consumer may interact with the consumer interface 304 by inputting required and/or desired features, monthly budget or full price, etc. The consumer interface 304 may provide a wide variety of features and specifications which the consumer may choose from in providing a request. Based on the information put into the consumer interface 304 from the consumer, the consumer interface 304 may provide one or more reports or offers to the consumer. As will be discussed in further detail below, the information provided by the consumer interface 304 may include current market prices for automobiles, including information relating to additional features, and may include information on specific automobiles, for example, which may be en route to a dealer near the consumer's present location or may be already owned by the consumer. The automobile market information processing system 302 may process data received by the consumer interface 304, as well as the dealer interface 306 and/or the manufacturer interface 308, to respond to a request from a consumer. For example, data from database system 310 may be queried for use in a report, or a recommendation may be provided by recommendation engine 312 according to the consumer request and current market data. The automobile market information processing system 302 may integrate data received from consumer interface 304, dealer interface 306, and manufacturer interface 308 to provide current and accurate information relating to the automobile market.

It should be appreciated that the consumer interface 304 may be specific to one particular manufacturer or may provide information for automobiles manufactured by multiple different manufacturers. For example, a consumer interface 304 may be a website with information for many manufacturers. For example, the consumer interface 304 may access or link to the manufacturer specific websites (e.g., Ford), particularly with regard to new automobile information, but also for used automobile information. Also, for example, a consumer interface 304 may be implemented as an automobile manufacturer's website. Typically, a manufacturer's website may provide consumers with a catalog like feature that provides information on different automobile models with any available options or features. For example, a manufacturer website may allow a consumer to select options that are desired to "build" a particular new automobile, and may provide price comparisons using suggested retail prices, which may consumers use for initial research into what pricing the dealer may offer for a particular automobile with a particular feature set. Also, typically, the consumer may enter information, including, for example, name, an address or zip code, and telephone number. This information may be passed on from the manufacturer to a nearby dealer and/or nearby dealer information may be provided to the consumer (e.g., the dealer in or nearest to the consumer's entered zip code). Accordingly, the dealer may contact the consumer, or the consumer may inquire with the dealer, regarding the specific automobiles available on that dealer's lot and particular pricing being offered, etc. In many cases, consumers may not inquire with dealers that the manufacturer may recommend, and similarly, dealers may not diligently follow up with consumers that have an interest in purchasing an automobile. Further, it should be appreciated that the information provided via a consumer interface 304 and/or a manufacturer website may be very useful to consumers. For example, in the past, dealers often provided brochures with all the information on a manufacturer's available car models, including all the features and options information. However, dealers typically do not provide comprehensive information brochures, which may be relatively expensive to produce, and rather, that information is typically located on a manufacturer website and/or a consumer interface 304. It should also be appreciated that information on a manufacturer website and/or a consumer interface 304 may be directed to both new and used automobiles. For example, historical and statistical information which demonstrates favorable safety ratings, quality and reliability data, low maintenance costs, low insurance prices, low emissions, high gas mileage, etc. based on specific models for specific years, and/or groups of models and years may be provided on a manufacturer website and/or a consumer interface 304.

Accordingly, the consumer interface 304 may provide a wide range of information, for example, based on any searches or queries performed by a user 114. In an example embodiment, based on a user search or request for a response, the consumer interface 304 will display a quality index or value index based on normalized calculations for an automobile. The recommendation engine 312 may provide recommendations to a consumer based on the current automobile market data stored in the automobile market information processing system 302. For example, metrics on gas mileage, emissions, operating and maintenance costs, safety ratings, etc. may be benchmarked against comparable automobiles of the same and different manufacturers. Similar purchase options to a specific search may also be provided, based on feature matching, price range, consumer popularity, etc. Information including price ranges, including MSRP, invoice prices, inventory levels, the user's 114 credit ratings (e.g., FICO score), may be provided which may include monthly payment estimates or projections. It should be appreciated that such data may be provided for both new and used automobiles. For example, a financing calculator may help a user 114 determine what financing rate is appropriate for an automobile purchase. It should be appreciated that dealers may mislead consumers into believing that a higher financing rate will be required to secure a loan. Further, for example, a lease vs. buy calculator may be provided which may use current market data including prices, interest rates, incentives, estimated mileage per year, etc. for providing an analysis for a particular consumer regarding purchasing or leasing. Also, the consumer interface 304 may provide a purchase checklist, for example, of ten steps to buying a car. A qualitative checklist may allow a user to ask the right questions and get the right answers from a dealer. Additional tips may be provided, such as a list of products or services dealers may attempt to sell to a consumer with an analysis of the value of these products or services and a recommendation to accept or decline these dealer offers. Further, beyond analysis relating to automobiles, additional analysis or reports may be provided, for example, relating to dealer reviews, other supplemental products, financial entities that may provide financing, etc. For example, dealer reviews may provide a consumer with information the consumer may use in addition to automobile pricing and delivery options. Moreover, the consumer interface 304 may provide a wide variety of useful information to a consumer, for at home research and preparation, and/or in a dealer location while shopping as a negotiating tool that may provide confirmation on pricing, useful tips, and the like. As will be discussed in FIG. 3B in further detail below, the consumer interface 304 may include a used automobile seller interface 318 and a used automobile buyer interface 320.

In an example embodiment, a dealer interface 306 may provide a user 114, such as a dealer employee, information relating to the current automobile market. The dealer interface 306 allows a dealer to interact with automobile market information processing system 302 to provide the dealer with a wide variety of information, including, for example, current market pricing. Other automobile market information a dealer may receive on a dealer interface 306 includes information relating to lot inventory, turnover rates, automobile transportation and/or shipping costs, incentives, and various ratings, such as ratings relating to quality, safety, insurance, a consumer credit score, dealer ratings, residual or resale values, etc. A dealer may input information into dealer interface 306 relating to sales data, including current pricing offered, special sales offers, actual transaction data, inventory data, etc. In an example embodiment, the dealer may provide information through dealer interface 306 which will be used by automobile market information processing system 302 to prepare reports or offers to consumers and/or manufacturers. It should be appreciated that a dealer is typically a franchise entity, while a distribution location may not be a franchise entity. For brevity, throughout this specification, the term dealer may be used to describe both franchise entity dealers and non-franchise entity distribution location. Accordingly, as used in this disclosure, the term dealer does not indicate whether an entity is a franchise entity. Moreover, a franchise dealer or a non-franchise distribution location may utilize a dealer interface 306 as described herein.

In an example embodiment, a manufacturer interface 308 may provide a user 114, such as a manufacturer employee, information relating to the current automobile market, including consumer requests. For example, an manufacturer interface 308 may provide a manufacturer a request received from a consumer interface 304. Additionally, the manufacturer interface 308 may provide information such as a report that allows the manufacturer to provide a response to the requesting consumer. A report may include information from database system 310 relating to current market pricing, recent sales figures and trends, current manufacturer incentives, current inventory, including dealer inventory, inventory in transit, and/or build times or lead times for a desired automobile, etc. The manufacturer may use this information to provide a response to a consumer request. The manufacturer may provide the manufacturer interface 308 with information to provide a confirmation, a verification, or an offer to a consumer via consumer interface 304. For example, a confirmation number associated with the particular consumer request may be provided for the consumer. Also, a recommendation may be provided from the recommendation engine 312 to the manufacturer in relation to automobile pricing, responding to a specific request, manufacturer incentives, inventory management, production schedules, shipping schedules, etc. It should be appreciated that a manufacturer may be referred to as an OEM or original equipment manufacturer. Further, it should be appreciated that a manufacturer may include various related affiliate entities all doing business as, or operating under, the same manufacturer name. For example, a manufacturer typically may include a manufacturing company (e.g., operating the manufacturing plant), a sales company (e.g., operating automobile sales activities), and a captive finance company (e.g., operating financing and leasing activities). The manufacturer interface 308 may provide a manufacturer with a real-time lens into the automobile market which may allow the manufacturer to adjust production schedules, pricing plans, marketing activities, etc., which may provide a significant advantage for manufacturers.

As illustrated in FIG. 3B, a consumer interface 304 may include a used automobile seller interface 318 and a used automobile buyer interface 320. The used automobile seller interface 318 may be used by consumer sellers to sell used automobiles, while the used automobile buyer interface 320 may be used by consumers to buy used automobiles. It should be appreciated that consumers may be able to access both interfaces 318 and 320 from consumer interface 304. In an example embodiment, the used automobile seller interface 318 and a used automobile buyer interface 320 may be integrated within a single website or application, or for example, may be implemented as distinct websites. Similarly, in an example embodiment, a used automobile buyer interface 320 may be integrated with features of a consumer interface 304 for searching both new and used automobiles for purchase, or new and used automobiles may not be simultaneously searchable on a particular implementation of a consumer interface 304. As will be discussed further below, a used automobile seller interface 318 may be used by a consumer seller of a specific used automobile to receive information on the specific automobile and request bids for the specific automobile. Similarly, a used automobile buyer interface 320 may be used for used automobile buyers to receive information on a used automobile and place a bid on that specific automobile.

It should be appreciated that, for example, a consumer seller of a used automobile may be considered different than a dealer seller of a used automobile in some respects. For example, a consumer seller of a used automobile is often selling through different channels, such as offering for sale in classified advertisements versus from a dealer lot. It should be appreciated that such differences may be relevant to the ability to maximize the value of a sale or purchase of a used automobile. Accordingly, where appropriate, the present disclosure may distinguish a consumer seller from a dealer seller, or distinguish a consumer buyer from a dealer buyer. Also, as discussed in further detail below, a manufacturer off-lease seller of a used automobile may also be considered different from a consumer seller and/or a dealer seller.

A dealer interface 306 may include a used automobile buyer interface 322. For example, a typical dealer may use a dealer interface 306 primarily for facilitating sales of new and used automobiles, however, the dealer interface 306 may also be used to facilitate purchasing used automobiles. For example, a used automobile buyer interface 322 may be used by dealers similarly to the way that the used automobile buyer interface 320 may be used by consumers. It should be appreciated that in an example embodiment, the used automobile buyer interfaces 320, 322 may be similar or the same, and/or may integrated as part of single website or application. In an example embodiment, a dealer may use the used automobile buyer interface 322 to facilitate bringing a consumer in to purchase a new automobile based on providing a competitive bid to purchase a used automobile as a trade in.

A manufacturer interface 308 may include a used automobile off-lease interface 324. For example, a manufacturer may use a manufacturer interface 308 primarily for facilitating sales of new automobiles, however, the manufacturer interface 308 may also be used to facilitate selling off-lease automobiles which have been returned by a consumer lessor whose lease is expiring. For example, an off-lease seller interface 324 may be used by a manufacturer, typically, a captive finance company of the manufacturer, similarly to the way that the used automobile seller interface 318 may be used by consumers. It should be appreciated that, a manufacturer off-lease seller may have limited options to sell a used off-lease automobile and may have time constraints that are may be typically imposed on a consumer seller of a used automobile. Typically, an off-lease automobile may be dropped off by a consumer lessee at any one of a variety of dealer locations. The manufacturer lessor may then wish to sell the used off-lease automobile, however, the dealer where the off-lease automobile was dropped off may have a significant bargaining advantage to purchase that automobile, as the manufacturer may need to sell the off-lease automobile quickly and may have limited options. Typically, the dealer may not offer the manufacturer off-lease seller full market value for the off-lease automobile. It should be appreciated that the manufacturer off-lease seller may transport the car to an auction in an attempt to obtain a higher price. However, transportation costs, auction fees, and delay in selling the off-lease automobile may cause the manufacturer off-lease seller to accept less than market value for the off-lease automobile from the dealer, or otherwise not maximize the value of the off-lease automobile. For example, typically, an off-lease automobile sold at auction for near or even above the current market value is significantly offset by transportation costs and auction fees.

The off-lease seller interface 324 may provide a manufacturer off-lease seller with leverage, not only through the ability to obtain bids to purchase the off-lease automobile, but through the ability to determine the number of matches or search hits for an off-lease automobile. The dealer that has the off-lease automobile may know that the manufacturer may have the ability to track searches for the off-lease automobile performed by consumers and/or other dealers. The manufacturer off-lease seller may provide the dealer in possession of an off-lease automobile with matches and/or bids, which may provide the dealer with firm evidence of current demand or interest in the off-lease automobile. The dealer may be able to use this information to determine an appropriate price, and possibly even more profitably than the manufacturer. Accordingly, a dealer may often be inclined to make a significantly more competitive bid for an off-lease automobile. It should be appreciated that the manufacturer may use the off-lease seller interface 324 to identify in-market buyers, and even without receiving bids from those buyers, the manufacturer's bargaining power may improve, resulting in a greater value for off-lease sales.

Accordingly, information may be provided to the automobile market information processing system 302 from consumers, dealers, and manufacturers with a very high degree of granularity, as every transaction that occurs and even every request or search may be stored and used by the automobile market information processing system 302. This allows the automobile market information processing system 302 to use the most current automobile market data to provide information to consumers, dealers, and manufacturers. It should be appreciated that market prices can change relatively quickly, particularly when major events drive consumer behavior or manufacturer production, such as natural disasters. Accordingly, reports and recommendations provided by the automobile market information processing system 302 may be highly accurate, reliable, and sensitive to market changes.

It should be appreciated that the users 114 of the automobile market information processing system 302, including consumers, dealers, and manufacturers, and buyers and sellers of new and used automobiles, may be required to agree to and/or execute a terms of use agreement or terms of service agreement. Various forms of enforcing the agreement may be implemented, including a transaction deposit policy, which may require a deposit or a credit card hold, or the like, and a standard schedule of fees or default payment schedule for infractions such as improper condition of an automobile, delay in delivery, etc. Accordingly, all parties may be protected from another party breaching the agreement.

It should be appreciated that certain functions described as performed, for example, at automobile market information processing system 302, may instead be performed locally at consumer interface 304, dealer interface 306, and manufacturer interface 308, or vice versa. Further, in certain cases, tasks may be performed using consumer interface 304, dealer interface 306, and manufacturer interface 308 or, for example, performed in person, such as a consumer signing documents at a dealer location, or a dealer communicating with a manufacturer using a telephone. It should be appreciated that the consumer interface 304, dealer interface 306, and manufacturer interface 308 may be implemented, for example, in a web browser using an HTML file received from the automobile market information processing system 302. In an example embodiment, the consumer interface 304, dealer interface 306, and manufacturer interface 308 may be located on a website, and may further be implemented as a secure website. Also, consumer interface 304, dealer interface 306, and manufacturer interface 308 may require a local application, for example, which a manufacturer or dealer may pay for to have access to, for example, information from the automobile market information processing system 302 such as requests from consumers.

Figure 4:
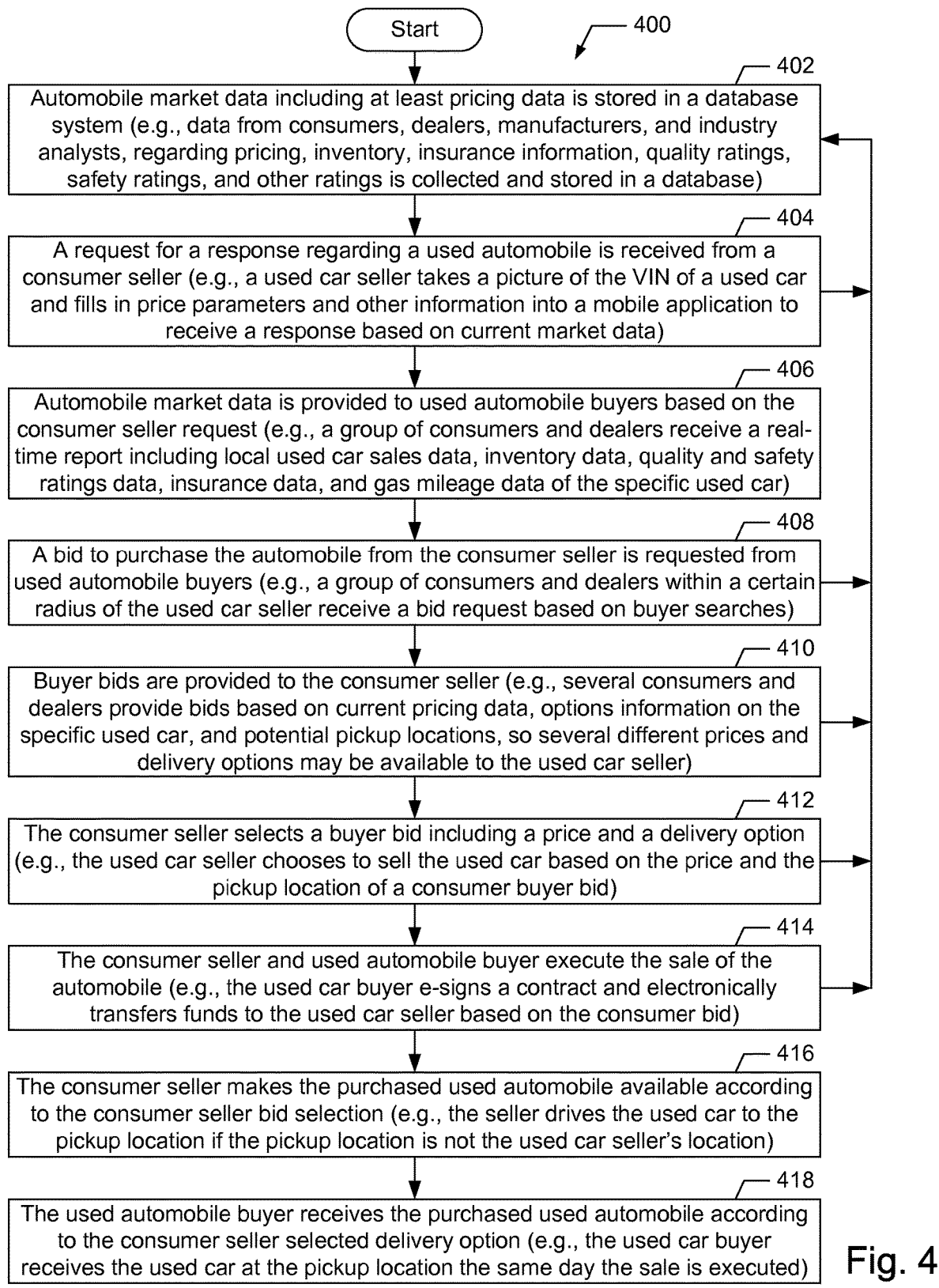
FIG. 4 is a flowchart illustrating an example process for facilitating a used automobile transaction, according to an example embodiment of the present invention.

FIG. 4 is a flowchart of an example process 400 for facilitating a used automobile transaction. Although the process 400 is described with reference to the flowchart illustrated in FIG. 4, it will be appreciated that many other methods of performing the acts associated with the process 400 may be used. For example, the order of many of the blocks may be changed, certain blocks may be combined with other blocks, and many of the blocks described are optional.

The example process 400 for facilitating a used automobile transaction may allow users 114 to efficiently sell and purchase automobiles. The example process 400 may begin with automobile market data including at least pricing data is stored in a database system (block 402). For example, automobile market data from dealers, consumers, and manufacturers regarding pricing, inventory, insurance information, quality ratings, safety ratings, and other ratings is collected and stored in a database. For example, inventory data may include data regarding off-lease automobiles, including scheduled drop off dates of automobiles with expiring leases. In an example embodiment, a wide variety of data is stored in a database system 310. Automobile market data may include various relevant ratings, reports, awards, or other information, including quality information, safety information, insurance information, consumer credit information, dealer rating information, incentive information, residual value information, and/or any other data which may be relevant to consumers. For example, ratings data may include information from the National Highway Traffic Safety Administration (NHTSA), the Environmental Protection Agency (EPA), and/or the Insurance Institute for Highway Safety (IIHS). The data may include information from a consumer interface 304, such as data in consumer searches or requests, information from a dealer interface 306, such as currently offered dealer pricing, transaction data for finalized sales, current inventory data, transport or shipping costs, and information from a manufacturer interface 308, such as current manufacturer prices and suggested pricing, manufacturer incentives, and current inventory including finished inventory on hand, production scheduling, shipment scheduling, inventory in transit, and manufacturing lead times. The automobile market data may be comprised solely of information received from the consumer interface 304, dealer interface 306, and manufacturer interface 308, or may include additional information received from other sources, for example, industry analysts, consumer reports groups, government agencies, etc. It should be appreciated that various methods of storing the automobile market data may be employed according to the system requirements. For example, database system 310 may be organized according to different manufacturers or dealers, automobile make and model, different information categories (e.g., suggested pricing, market prices, production, shipping, lot inventory), etc., and may consist of one or more databases on one or more servers 108, 226 which may be remotely located from each other and/or a host device 104 of the automobile market information processing system 302. As will be discussed further below, the automobile market data may be continually updated as new data is provided to the automobile market information processing system 302.

The automobile market data may be used by any or all parties involved in a used automobile transaction, including used automobile sellers including consumer sellers and manufacturer off-lease sellers, and used automobile buyers including consumer buyers and dealer buyers. In the example process 400, as discussed further below, the used automobile seller described by way of example as a consumer seller. It should be appreciated that the example process 400 may work similarly or the same for a manufacturer off-lease seller. In an example embodiment, the consumer used automobile seller interface 318 and manufacturer off-lease seller interface 324 may be provided as a combined interface. Certain aspects of the disclosed example process 400 may be of greater or lesser advantage to a manufacturer off-lease seller compared with a consumer seller. For example, consumer sellers typically sell used automobiles infrequently, while manufacturer off-lease sellers may be selling thousands of used off-lease automobiles each month. Accordingly, the goals of the user 114 may vary between consumer sellers and manufacturer off-lease sellers.

Certain notable aspects that may be distinguishable between a consumer seller and manufacturer off-lease seller will be discussed below.

The example process 400 continues with a consumer seller providing a request for a response (block 404). For example, a used car seller takes a picture of the vehicle identification number (VIN) of a used car and fills in price parameters and other information into a mobile application to receive a response based on current market data. In an example embodiment, the seller's request may be transmitted from used automobile seller interface 318, 324 via the internet to the automobile market information processing system 302. For example, using an application stored on a mobile device 103, the used car seller takes a picture of the VIN on the used car and fills in a minimum bid price, delivery parameters, etc. The seller's parameters may specify a pickup location by distance from an address, an area code, etc., which allows for matching the seller with buyers that are in-market. The picture of the VIN may be processed using optical character recognition, which allows the automobile market information processing system 302 to determine the make and model of the car, along with various other characteristics of the car. Also, for example, the used car seller may take a picture of the odometer, and the mileage may be determined using optical character recognition. It should be appreciated that the VIN may include human readable characters, a bar code, or any other graphical or machine readable information which acts as a vehicle identification number.

Also, the used car seller may input into a mobile application or website a wide variety of additional information about the used car. For example, pictures of the used car may be uploaded with the request. In an example embodiment, pictures of the exterior, interior, dashboard, and/or odometer may be provided. Also, for example, service records, ownership records, and other documents or information may be included with a request. Further, a written description of the car may be provided. Accordingly, because the used car seller can provide information such as pictures, in addition to information which the seller may not have access to, such as the original manufacturer specifications of the used car, potential buyers may have access to a great deal of information on the used car. Further, in an example embodiment, a mobile application may include the geolocation of a used car seller, so the seller does not need to enter such information. Accordingly, the buyer may perform research, for example, while at home or while shopping at a dealer location. It should be appreciated that certain used car buyers may be highly interested in the geolocation of the consumer seller. For example, a dealer may find the consumer seller's geolocation to be more important than a consumer buyer, because a dealer may require a minimal cost for picking up a car to ensure profitability, and to optimize the opportunity for creating a new customer relationship. Similarly, certain used automobile sellers may be very interested in the geolocation of the used automobile buyer. For example, a manufacturer off-lease seller may have a high interest in determining the amount of in-market interest or demand for an off-lease automobile.

In an example embodiment, a manufacturer off-lease seller may provide a request for a response for an automobile that will be dropped off by a consumer lessee in the near future. For example, a manufacturer user 114 may input a VIN into off-lease seller interface 324 by typing, speaking, or providing an image of the VIN. The manufacturer off-lease seller may provide a parameter that the used off-lease automobile will be available only after a certain date. The manufacturer off-lease seller may find that providing a request for a response prior to the consumer lessee actually dropping off an off-lease automobile may significantly improve the value of off-lease automobiles. It should be appreciated that the dealer where the consumer lessee drops off the off-lease automobile may be bargaining without any particular advantage because the manufacturer off-lease seller may have multiple interested used automobile buyers that, based on search parameters, have received the off-lease automobile as a match, and/or bids from used automobile buyers.

Used car buyers may perform a search with used automobile buyer interfaces 320, 322, and may typically include parameters limiting the search to a specific automobile type, make, or model, certain options or features, a price range, and a pickup location or area. Further, for example, the buyer may take a picture of a VIN anywhere or manually type in a VIN number, including at automobile trade shows, mall displays, or anywhere new or used cars are for sale. The buyer may even take a picture of a car parked in the street as the buyer walks down the street. Any request or query communicated from the consumer interface 304 may be stored, for example, in database system 310, thereby updating the automobile market information processing system 302 with current automobile market data.

The example process 400 may continue with providing automobile market data to used automobile buyers based on the consumer seller request (block 406). For example, a group of consumers and dealers receive a real-time report including local used car sales data, inventory data, quality and safety ratings data, insurance data, and gas mileage data of the specific used car which is identified based on the VIN. The group of consumers and dealers that receive a real-time report may be based on prior searches conducted by consumers on used automobile buyer interface 320 and searches conducted by dealers with used automobile buyer interface 322. In an example embodiment, a report may include quality information, safety information, insurance information, recall information, EPA gas mileage and emissions information, consumer credit information (e.g., buyer FICO score), dealer rating information, incentive information, residual value information, and/or any other data which may be relevant to consumers and/or dealers. In an example embodiment, a report may include a specific history information for the specific used car, such as a CARFAX report. The request and/or the report may be provided in real-time and may also provide real-time data. Data reported based on a real-time updates in the automobile market information processing system 302 may provide significant advantages, for example, when pricing conditions may change quickly due to unforeseen market conditions. The recommendation engine 312 may provide recommendations to a used automobile buyer based on the current automobile market data. For example, a report may indicate various estimated sales probabilities for different prices that the used automobile buyer may offer or bid. In an example embodiment, a estimated sale price or range may be provided. For example, a probability analysis may be provided with prices and corresponding probabilities may be estimated as, e.g., 80% chance to purchase at $6,000; 60% chance to purchase at $5,500; 30% chance to purchase at $5,000; 10% chance to purchase at $4,500. Such information may be illustrated in various ways, such as a bell curve graph or a chart. Further, for example, the recommendation engine may provide daily suggestions (e.g., a deal of the day) for dealers and/or consumers. Consumers may use such suggestions to save money or get a better value on a used car purchase by buying from another consumer rather than a dealer. Dealers may use such suggestions to purchase used cars at good deals, and/or to attract consumers to visit the dealer in person or online, as well as prepare responses or bids to other consumer requests. Dealers or consumers may customize the used automobile buyer interface 320, 322 to provide information in a pre-specified manner to suit the particular needs of the specific dealer or consumer. In an example embodiment, a manufacturer off-lease seller may receive automobile market data including inventory information including data regarding off-lease cars which have been dropped off at dealer locations and cars which will soon be coming off-lease. Further, dealers and/or consumers may be able to receive information regarding off-lease cars as well. For example, information may include a specific automobile identified by a VIN with an expected drop off location and date based on a lease expiration.

A bid to purchase the used automobile from the consumer seller is requested from used automobile buyers (block 408). For example, a group of consumers and dealers within a certain radius of the used car seller location may receive a bid request based on used automobile buyer searches via used automobile buyer interfaces 320, 322. Each used automobile buyer's bid may include, for example, a price and a delivery option or delivery suggestion. The used automobile buyer interfaces 320, 322 may provide for simple input of necessary and optional data. Further, a used automobile buyer's bid may contain certain limitations, restrictions, or conditions. For example, a dealer may provide a bid with the condition that a new car be purchased and the used car be traded in at the bid price.

In an example embodiment, the request may provide one or more options, products, services, or add-ons for a used automobile buyer to select from. For example, used automobile buyers may be able to select financing options, warranties, extended service contracts, insurance plans, or other hard add accessories. These selectable options may be offered directly from the used automobile seller or may be offered through the automobile market information processing system 302. Accordingly, a seller may not be offering any options for a buyer to select, but the system may automatically provide the option to purchase further add-ons. In an example embodiment, automobile market information processing system 302 may provide for third party providers of add-ons to provide live auction bids for a used automobile buyer to select for inclusion in a bid. Accordingly, for example, several insurance companies may provide a bid for key insurance, or several financial companies may provide bids for a loan. It should be appreciated that certain bids may depend on the particular buyer, so for example, a buyer's credit or driving record may cause different buyers to receive different third party bids for add-ons. For example, a particular buyer may be able to increase a bid to purchase a used automobile if third party add-ons are particularly advantageous, which may benefit a consumer seller or manufacturer off-lease seller. For example, a buyer may receive a better than expected interest rate and insurance price, and therefore be able to offer an additional $1,000 to the seller, while staying within the buyer's predetermined monthly budget. It should be appreciated that third parties may include dealers which may be otherwise involved in a transaction. Also, in an example embodiment, the automobile market information processing system 302 may provide at no charge to the buyers or sellers, certain add-ons, such as a limited thirty day warranty. Accordingly, the automobile market information processing system 302 may gain trust from buyers even if the buyers generally do not trust the sellers. It should also be appreciated that a buyer may not select any add-ons offered by third parties and/or the automobile market information processing system 302. A used automobile seller may have no interest in whether a buyer selects any add-ons, or the seller may receive additional compensation if an add-on is selected, so a buyer selection of add-ons may or may not affect a seller's value associated with the buyer's bid.

One or more buyer bids are provided to the consumer seller (block 410). For example, several consumers and dealers provide bids based on current pricing data, options information of the specific used car, and potential pickup locations, so several different prices and delivery options may be available to the used car seller via the used automobile seller interface 318. Typically, the bid will include at least a specified price and pickup time and location. In an example embodiment, a used car seller that has taken a picture of a VIN with a mobile device and entered some basic information such as an odometer reading may receive used car buyer bids within minutes or seconds on the mobile device. Accordingly, the bids may be used in real-time as the consumer seller may be actively selling a used car or shopping for a new or used car, for example, on a dealer lot. Typically, a pickup location will be at the consumer seller location, a consumer buyer location, or at a dealer lot or distribution location. In an example embodiment, the consumer buyer location may be determined using the geolocation of the buyer's mobile device 103. It should be appreciated that some consumers may be flexible as to the delivery options and that some dealers may have multiple locations which could serve as a pickup location. In an example embodiment, the automobile market data may indicate that the particular used car that a consumer seller has requested bids for should be priced at, for example, $6,000. However, various factors may affect the bid or offer that a consumer or dealer may make for the specific used car. For example, for a consumer, personal preference for certain features or looks, convenience, insurance implications, gas mileage, and/or service records, may play a large role in pricing a bid above or below a suggested bid price. For example, for a dealer, the potential for forming a customer relationship, the value of potential other sales, add-on products, and/or services, or competition with other parties. All used automobile buyers that are interested may place a bid for a used car seller's consideration.

It should be appreciated that various alternative delivery options may be provided from several used automobile buyers' bids, for example, based on preferences or parameters indicated by the consumer seller of the used automobile. For example, the used automobile seller interface 318 may provide several different bids with different delivery options and prices to the used car seller, for example, a price of $6,000 to drop off the car at an out of state dealer the next day or a price of $5,500 to drop off the car at a local consumer buyer location in five days. For example, a consumer buyer may determine the cost of picking up the used car from the consumer seller and provide two pricing and delivery options, for example, $5,500 to pick up the used car from the consumer seller or $5,800 to have the used car delivered to the consumer buyer's home. For example, a manufacturer off-lease seller may review bid prices and delivery options on a number factors on used automobile seller interface 324, but may be very interested in finding an in-market buyer to eliminate transportation costs. A manufacturer off-lease seller may often have somewhat different concerns than a consumer seller. For example, to meet a quarterly budget, a manufacturer off-lease seller may be primarily interested eliminating a high back log of off-lease cars even if selling cars at a significant discount is required.

Further, for example, used automobile buyers may use information such as ratings data to optimize their bids. For example, if gasoline prices are increasing, mileage ratings for a particular car may dictate increasing or decreasing a bid. If a vehicle has very good gas mileage, and gas prices are skyrocketing, that car may have an increasing demand as gas prices increase, or vice versa. Similarly, safety ratings of vehicles may be important to consumer demand if high profile problems have appeared for a particular automobile style, make, or model. As discussed above, various automobile market information may be used by a used automobile buyer including safety information, insurance information, consumer credit information, dealer rating information, incentive information, residual value information, and/or any other data which may be relevant.

The used automobile seller interface 318, 324 may organize used automobile buyer bids based on a variety of factors and may provide supplemental information. For example, certain buyer bids may be selected as the best options, all buyer bids may be summarized, various additional ratings, reviews, or popularity information, special offers, etc. may also be provided to a consumer along with any used automobile buyer bids. The recommendation engine 312 may provide recommendations to a consumer seller based on the current automobile market data. For example, of ten used automobile buyer bids provided with a response, three bids may be recommended, for example, as "Great Deals!" It should be appreciated that in some cases, a particular used car seller request may not return any buyer bids, for example, if the used car for sale is in low demand or a unique item with a limited market. Also, for example, if only one or two bids are received, the recommendation engine 312 may recommend that a consumer seller wait for a better bid because the bids provided are not competitive offers based on the current automobile market data stored in the database system 310. Further, in an example embodiment, buyer bids may be organized according to distance to a pickup location, highest price, closest match to the consumer seller entered criteria, a normalized quality index or value index, etc. The consumer seller or manufacturer off-lease seller may be able to toggle between different viewing options for buyer bids.

Further, in an example embodiment, a consumer seller may be at a dealer lot (e.g., a Nissan dealer) and take a picture of a VIN on a used car (e.g., a Maxima), which the consumer seller intends to trade in. A bid from a competing dealer (e.g., a Toyota dealer) across the street may be received on the mobile device within seconds and include information for a competing trade in value, and may have further information relating to other new or used cars which may be intended to cause the consumer seller to go to the competing dealer, for example, including various price comparisons, gas mileage ratings, safety ratings, residual value, driving directions to the competing dealer, etc. Accordingly, a consumer seller may weigh the pros and cons of various used automobile buyer bids from consumers and/or dealers, based on delivery options, pricing, and any other relevant variants. Any bids communicated from used automobile buyer interfaces 320, 322 may be stored, for example, in database system 310, to further update the automobile market information processing system 302 with current automobile market data.

The consumer seller selects a buyer bid including a price and a delivery option (block 412). For example, the used car seller chooses to sell the used car based on the price and the pickup location of a consumer buyer bid. The seller may select an offer with a specified price and delivery option on the used automobile seller interface 318, 324. The used car seller may have been weighing two or more different delivery options, price differences, etc., based on the response(s) received through the used automobile seller interface 318, 324. As noted above, the used automobile seller interface 318 may organize received bids and other helpful information in a variety of ways, which may make the information easier for a consumer seller to digest. It should be appreciated that a consumer seller will typically want to deliver a used car at a convenient location, often at or near the seller's home. Accordingly, used automobile buyers may attempt to provide delivery options tailored towards maximizing profit and convenience, while still providing a superior bid to other used automobile buyers. By providing multiple bids with different delivery options, the consumer seller may be allowed to make extra money or save time based on the seller's particular situation. It should be appreciated that the consumer seller selection of a bid may, for example, occur simultaneously with the consumer seller and used automobile buyer executing the sale or providing a deposit or down payment, or the like (see, e.g., block 414). Accordingly, in an example embodiment, once a consumer seller or manufacturer off-lease seller selects a bid, the used automobile buyer has effectively purchased the car, and both parties do not need to worry about the other party backing out of the deal.

It should be appreciated that a consumer seller may not want to drive to a distant pickup location without first receiving some form of deposit, or likewise, a used automobile buyer may not want to go to a distant pickup location to without assurance that the used automobile will actually be available for pickup and in good working order. Likewise, a manufacturer off-lease seller may be concerned with obtaining maximum value for an off-lease automobile within the required time constraints, but transportation costs may be strictly budgeted. The automobile market information processing system 302 may accommodate for deposits to provide any reasonable or necessary assurances to both buyers and sellers. For example, the automobile market information processing system 302 may provide and/or require the use of a terms of service agreement, which the consumer seller or manufacturer off-lease seller and the used automobile buyer may sign and agree to the terms provided therein. For example, a credit card could be charged a default payment in the event that either party breaches the terms of service agreement. In an example embodiment, a schedule of various breaches may require different default payments, for example, if a buyer determines a headlight does not work, a standard $30 fee may be assessed from the consumer seller. Also, a variable default agreement may be based on a distance between a seller and a buyer, so that a party which travels a great distance may be compensated if the other party breaches the agreement. Also, for example, a time period for inspection may be specified in a request and/or a bid. A bid may be conditional based on one or more seller representations. Moreover, a terms of service agreement may provide assurances for any issues which may arise in the sale of a used car, and may provide one or more options based on a breach, including payment of fees or nullification of a bid acceptance and/or sale execution. Any consumer seller selections, counter offers, or additional requests or responses may be stored in database system 310, as the communications are processed by automobile market information processing system 302, providing further data updates. Accordingly, in an example embodiment, a consumer seller may select a bid in order to sell the used car, and that sale information may then be provided to another consumer searching for information regarding the same type of car with similar features, for example, the next day.

The consumer seller and the used automobile buyer execute the sale of the used automobile (block 414). For example, the used automobile buyer electronically signs a contract and performs an electronic funds transfer or credit card payment. After a buyer bid is selected, an electronic contract may be prepared by the automobile market information processing system 302 and provided for the used automobile buyer who may e-sign the contract or other documentation as needed. Similarly, the consumer seller may e-sign the contract or other documentation as needed, either prior to selecting a bid, at the time of selecting a bid, or at a later time. A contract may be e-signed through the used automobile seller interface 318, 324, and the used automobile buyer interface 320, 322, respectively. In another example embodiment, paper copies of a contract may be signed, for example, after the used automobile buyer prints them or receives them through the mail. In an example embodiment, the used automobile buyer may provide cash or a paper check. It should be appreciated that the process of executing a contract may take some time. Also, it should be appreciated that, for example, the consumer seller selection of a bid discussed above (see, e.g., block 412) may occur simultaneously with the consumer executing the sale. Once the sale is completed, the actual transaction data including the final sale price, may be provided to and stored in database system 310. Accordingly, the automobile market information processing system 302 may be updated with current automobile market data from every step in the used car sales process between a consumer seller or manufacturer off-lease seller and a used automobile buyer. In an example embodiment, the updates provided to the automobile market information processing system 302 are provided in real-time, for example, data may be transmitted and processed within seconds or minutes. Further, for example, it should be appreciated that certain data may be provided to the automobile market information processing system 302 according to a batch processing schedule.

Next, the consumer seller makes the purchased used automobile available according to the consumer seller bid selection (block 416). For example, the seller drives the used car to the pickup location if the pickup location is not the used car seller's location. It should be appreciated that the consumer seller or a manufacturer off-lease seller and the used automobile buyer may use a wide variety of locations as a pickup location, and may work out a delivery option which is convenient for both parties. A consumer seller may interact with the automobile market information processing system 302 using used automobile seller interface 318, for example, to provide notification that a car is at the pickup location and ready for delivery. A manufacturer off-lease seller may interact with the automobile market information processing system 302 using used automobile seller interface 324, for example, to provide notification that a car has been dropped off by a consumer lessee and is at the pickup location and ready for delivery to the buyer. Similarly, a notification may be sent via used automobile buyer interface 322, 322 to the used car buyer that the used car is available for pickup at the specified location.

Finally, the used automobile buyer receives the purchased used automobile according to the consumer seller selected delivery option (block 418). For example, the used car buyer receives the used car at the pickup location the same day the sale is executed. The used car buyer may pick up the car without ever having to talk to or negotiate, in person or over the telephone, with the consumer seller or manufacturer off-lease seller. For example, the used car buyer may arrive at the pickup location, show identification and provide a proof of purchase, and be provided the keys to the car by the seller. The parties may sign paperwork indicating or confirming the car has been picked up. Proof of purchase documentation may include any or all documents that are legally required for an automobile sale for a given jurisdiction, for example, the title, odometer statement, or any other document required by the Department of Motor Vehicles. For example, the consumer seller or manufacturer off-lease seller may be required to provide any legally required documents to fully execute and record the sale of the used car.

Further, in an example embodiment, a consumer seller or manufacturer off-lease seller may offer various insurance policies or service contracts to a used car buyer, for example, etch insurance, key insurance, gap insurance, or a ninety day warranty may be provided. For example, a consumer seller or manufacturer off-lease seller may purchase insurance through the automobile market information processing system 302 in placing a request for bids, which may increase interest from buyers. Also, for example, an insurance policy or service contract may be provided for a used car being sold at no charge to the consumer seller or manufacturer off-lease seller, for example, as a convenience to all users 114 using the disclosed system. For example, key insurance may be provided at no cost to both the consumer seller and the used car buyer. It should be appreciated that, for example, using options provided through the automobile market information processing system 302, a consumer seller or manufacturer off-lease seller may sell or provide any add-on products or services that a dealer would typically offer or provide in the sale of a used automobile. Also, if the used automobile buyer is a dealer, additional products or services may be offered to the consumer seller at the time of pickup. For example, the dealer may offer new or used cars, including related financing options, warranties, service plans, insurance plans, and hard add accessories to the buyer, as discussed in further detail above.

Accordingly, it should be appreciated that consumers, manufacturers, and dealers, may receive significant benefits from the method of facilitating a used automobile transaction disclosed herein. Consumers that are selling and buying used automobiles may benefit from more competitive pricing, piece of mind knowing that a fair market price is being offered for prospective purchases or sales, and improved delivery options that allow the consumer to weigh the benefits and drawbacks of different delivery options, pricing, and other variables. In an example embodiment, consumers can view prices paid for comparable cars in specific locations based on the automobile market data in the automobile market information processing system 302, for example, within a certain time frame such as one month and within a certain proximity to the consumer. Manufacturers selling off-lease automobiles may benefit from reduced transportation costs, saving auction fees, and an improved bargaining position with a dealer in possession of an off-lease automobile. For example, the ability to identify in-market buyers may be particularly advantageous to manufacturer off-lease sellers, which may be able to identify matching searches of in-market buyers. Also, dealers and/or various third parties may benefit from the opportunity to sell insurance, credit, service contracts, hard add accessories, and other add-ons with used automobiles. Moreover, various inefficiencies in the automobile industry may be minimized utilizing the presently disclosed system and method.

Figure 5:
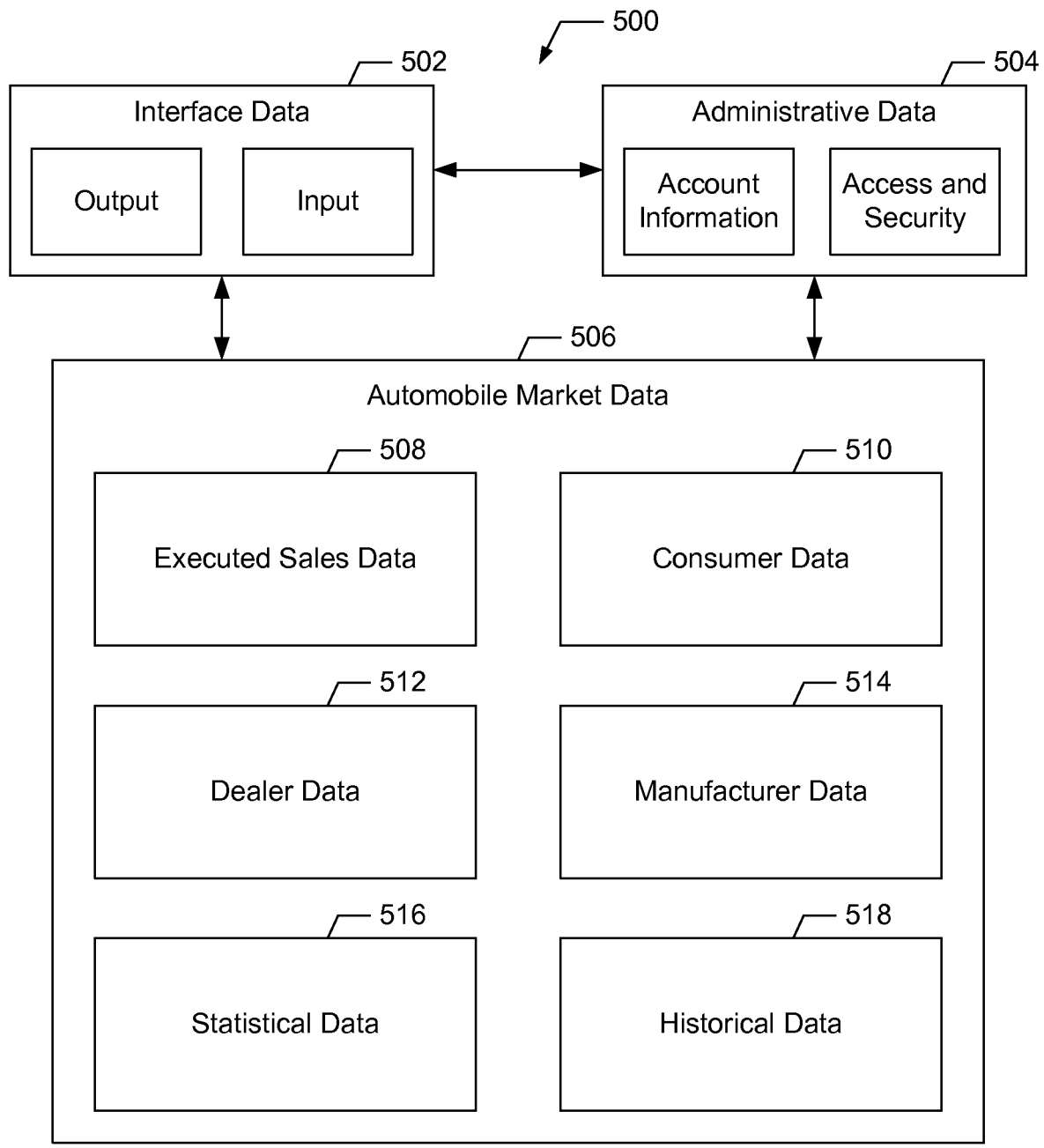
FIG. 5 is a block diagram showing an example data architecture, according to an example embodiment of the present invention.

FIG. 5 illustrates a block diagram of an example data architecture 500. In the example data architecture 500, interface data 502, administrative data 504, and automobile market data 506 interact with each other, for example, based on user commands or requests. The interface data 502, administrative data 504, and automobile market data 506 may be stored on any suitable storage medium (e.g., server 226). It should be appreciated that different types of data may use different data formats, storage mechanisms, etc. Further, various applications may be associated with processing interface data 502, administrative data 504, and automobile market data 506. Various other or different types of data may be included in the example data architecture 500.

Interface data 502 may include input and output data of various kinds. For example, input data may include mouse click data, scrolling data, hover data, keyboard data, touch screen data, voice recognition data, etc., while output data may include image data, text data, video data, audio data, etc. Interface data 502 may include formatting, user interface options, links or access to other websites or applications, and the like. Interface data 502 may include applications used to provide or monitor interface activities and handle input and output data.

Administrative data 504 may include data and applications regarding user accounts. For example, administrative data 504 may include information used for updating accounts, such as creating or modifying consumer accounts and/or dealer accounts. Further, administrative data 504 may include access data and/or security data. Administrative data 504 may include a terms of service agreement. Administrative data 504 may interact with interface data in various manners, providing a user interface 304, 306, 308 with administrative features, such as implementing a user login and the like.

Automobile market data 506 may include, for example, executed sales data 508, consumer data 510, dealer data 512, manufacturer data 514, statistical data 516, and/or historical data 518. Executed sales data 508 may include actual negotiated prices for manufacturer and dealer sales, differences in list prices to negotiated prices, sales demographics, etc. Consumer data 510 may include consumer search activity, consumer requests and offers, consumer feedback, etc. Dealer data 512 may include dealer pricing, including list prices, sale prices for limited time dealer offers or deals of the day, negotiation information such as bottom line pricing, offers received, foot traffic activity, and dealer inventory data, including current on location data, automobile turnover rates, etc. Manufacturer data 514 may include manufacturer pricing, including suggested pricing, preferred dealer pricing, etc., manufacturer incentives including cash rebates, special lease rates, special APR rates, zero down offers, lifetime warranties, guaranteed trade-in offers, etc., and inventory information including dealer inventory, inventory by location, inventory in transit, manufacturing or production lead times or build times, production scheduling, shipping scheduling, lease information, etc. Statistical data 516 may include information used for providing reports including graphs, forecasts, recommendations, calculators, depreciation schedules, tax information, etc., including equations and other data used for statistical analysis. Historical data 518 may include past sales data, such as historical list prices, actual sale prices, manufacturer and dealer margins, operating costs, service costs or profitability, loyalty information, etc. It should be appreciated that data may fall under one or more categories of automobile market data 506, and/or change with the passage of time. For example, industry analyst data may include historical data 518 and statistical data 516 relating to safety or quality reports, efficiency data, recall data, and the like for used automobiles, which may be organized or re-organized under various categories of automobile market data 506 as time passes or as supplemental data is provided to the automobile market information processing system 302. It should be appreciated that a system administrator may load data into the automobile market information processing system 302 as it becomes available. For example, annual, quarterly, and/or monthly reports relating to safety, insurance, etc., may be input into automobile market data 506 on a regular basis. It should also be appreciated that automobile market data 506 may be tailored for a particular manufacturer and/or dealer, for example, a manufacturer may request that a specific type of data that is not normally stored or used be stored in the database system 310. Accordingly, for example, customized reports may be provided to a manufacturer interface 308 using that specific data for the manufacturer, for example, relating to resale values of used automobiles.

The integration of the various types of automobile market data 506 received from the consumer interface 304, dealer interface 306, and manufacturer interface 308 may provide a synergistic and optimal resource for consumers, dealers, and manufacturers alike. In an example embodiment, a used automobile seller and a used automobile buyer may benefit greatly from using an application in a mobile device 103 to provide a request for buyer bids on a used automobile by taking a picture of the VIN of the used automobile, for example, using used automobile seller interface 318, 324. Used automobile buyers may search for used automobiles for sale by consumer sellers, for example, using used automobile buyer interface 320. The used automobile buyers may receive intrabrand and/or interbrand seller request information in real-time. The intrabrand and interbrand information provided on the used automobile buyer interface 320 may allow the best automobile options for a particular consumer to be provided to that consumer, and may allow consumer sellers, manufacturer off-lease sellers, and dealers to compete with each other taking into account a greater amount of automobile market information, which may result in a more efficient automobile market. Consumers that are selling used automobiles and consumers that are buying used automobiles may similarly receive benefits from the presently disclosed system. Also, as discussed above, manufacturer off-lease sellers may benefit greatly from the presently disclosed system, for example, using bids and/or matches or search hits for an off-lease automobile to improve bargaining power with a dealer in possession of the off-lease automobile and other dealers and/or consumers.

Automobile market data 506 may be maintained in various servers 108, in databases or other files. It should be appreciated that, for example, a host device 104 may manipulate automobile market data 506 in accordance with the administrative data 504 and interface data 502 to provide requests or reports to users 114 including consumers, dealers, and manufacturers, and perform other associated tasks. It should also be appreciated that automobile market data 506 represents automobile market information, and that these terms may be used interchangeably in this disclosure depending upon the context.

FIG. 6 is flow diagram illustrating an example process 600 for facilitating a used automobile transaction, according to an example embodiment of the present invention. Although the process 600 is described with reference to the flow diagram illustrated in FIG. 6, it will be appreciated that many other methods of performing the acts associated with the process 600 may be used. For example, the order of many of the blocks may be changed, certain blocks may be combined with other blocks, and many of the blocks described are optional.

In the example process 600, data may flow between the automobile market information processing system 302 and a used automobile seller interface 318, 324 and a used automobile buyer interface 320, 322, as discussed above based on used automobile seller and buyer interaction with the automobile market information processing system 302. As discussed above, a used automobile seller interface 318 and used automobile buyer interface 320 may be included in a consumer interface 304, a used automobile buyer interface 322 may be included a dealer interface 306, and a used automobile seller interface 324 may be included in a manufacturer interface 308. It should be appreciated that the automobile market information processing system 302 may update the automobile market information stored in the database system 310 when automobile market information is received from a buyer or seller, and/or a consumer, a dealer, a manufacturer, an industry analyst, and/or from any other information source. Accordingly, the automobile market information may remain current and/or provide sufficiently recent data for the benefit of consumers, dealers, and/or manufacturers.

The example process 600 may begin with a consumer seller or a manufacturer off-lease seller of a used automobile taking a picture of the VIN using a mobile phone application and entering in information such as pricing parameters (block 602). The used automobile seller interface 318, 324 may use OCR to determine and provide the VIN and pricing parameters to the automobile market information processing system 302 as a consumer seller request or a manufacturer off-lease seller request (block 604). It should be appreciated that OCR may occur in the automobile market information processing system 302 or at the used automobile seller interface 318, 324. The automobile market information processing system 302 receives the seller request and prepares automobile market information based on the seller request (block 606). The automobile market information processing system 302 may send a bid request and automobile market information based on the seller request to the used auto buyer interface 320, 322 for one or more consumers and/or dealers (block 608). It should be appreciated that while the seller request is automobile market information, typically, additional automobile market information would be provided with the seller request. For example, typically, data relating to recent sales of similar used automobiles and/or comparable automobiles may be provided. In an example embodiment, a target price or "true" value of the used automobile, or an expected price range, may be provided. Also, for example, various gas mileage data, safety ratings, recall information, quality reports, estimated insurance costs, and the like may be provided. Further, add-on products or services, such as insurance, credit, warranties, service contracts, or hard add accessories, which may be determined based on a third party bidding process, may also be provided. One or more used automobile buyers, including consumers and/or dealers, receive the bid request and automobile market information, determine prices and delivery options for the used automobile using the automobile market information, and prepare and provide bids for the consumer seller or a manufacturer off-lease seller (block 610). A buyer bid may be sent from the used automobile buyer interface 320, 322 to the automobile market information processing system 302 for each consumer and/or dealer that wants to provide a bid (block 612). The automobile market information processing system 302 receives and processes buyer bids and prepares the bids and automobile market data for the consumer seller or manufacturer off-lease seller (block 614).

The automobile market information processing system 302 may send buyer bids and automobile market information to the used automobile seller interface 318, 324 (block 616). It should be appreciated that automobile market information may be provided to the consumer seller or manufacturer off-lease seller before buyer bids are provided, and/or concurrently with buyer bids. The seller may receive the buyer bids and automobile market information and may select a bid including a delivery option based on the automobile market information (block 618). The used automobile seller interface 318, 324 may send to the automobile market information processing system 302 a selection of a bid indicating that the consumer seller or manufacturer off-lease seller wants to sell the used automobile based on the selected bid (block 620). The automobile market information processing system 302 receives and processes the seller bid selection (block 622). For example, the automobile market information processing system 302 may send the bid selection to the used automobile buyer interface 320, 322 (block 624). The used automobile buyer may receive the bid selection and coordinate a sale by, for example, setting up a pick up time and location for the used automobile at the seller location or the buyer location (block 626). Also, for example, the automobile market information processing system 302 may provide contract or loan documents, collect a deposit or down payment, or the like, from the consumer seller, the manufacturer off-lease seller, and/or the used automobile buyer. As discussed above, in each of blocks 606, 614, and 622, the automobile market information processing system 302 may update the automobile market information in the database system 310 based on the information received from the consumer, manufacturer, and/or dealer.

For exemplary purposes, the present disclosure discusses a various examples relating to a purchase of a used car. However, it should be appreciated that the disclosed system, methods, and apparatus may be advantageously used in relation to various used automobiles other than cars including, for example, trucks, vans, sport utility vehicles, jeeps, motorcycles, commercial vehicles, and/or automobiles that have a VIN and require a license plate to operate.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

Further, it will be appreciated that the presently disclosed system, methods, and apparatus for performing used automobile transactions may be utilized in conjunction with other systems or methods. For example, the presently disclosed system, methods, and apparatus may be used in conjunction with the disclosure in the co-pending commonly-owned patent applications filed on Jul. 5, 2011, entitled "AUTOMOBILE TRANSACTION FACILITATION USING A MANUFACTURER RESPONSE," application Ser. No. 13/176,497, and entitled "AUTOMOBILE TRANSACTION FACILITATION BASED ON CUS- TOMER SELECTION OF A SPECIFIC AUTOMOBILE," application Ser. No. 13/176,525, the entire contents of each of which is incorporated by reference herein, and in an example embodiment, the features of which may be combined with the features of the present disclosure.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
   receiving, via a used automobile seller interface, a first request for a response regarding a first used automobile, the first request made by a used automobile seller located at a first location and including a vehicle identifier and geolocation information of the first used automobile;
   determining, based on the geolocation information, that the first used automobile is located at the first location;
   generating, based on the determined first location, an in-market used automobile buyer area;
   determining that at least one used automobile buyer is located within the in-market used automobile buyer area;
   receiving, via a used automobile buyer interface, a first bid from a first used automobile buyer located at a second location within the in-market used automobile buyer area;
   generating, based on receiving the first bid, driving directions between the first location and the second location; and
   providing, via the used automobile seller interface, the first bid including at least a price for the first used automobile and the driving directions between the first location and the second location.

2. The method of claim 1, wherein the used automobile seller interface is a manufacturer off-lease seller interface, further comprising:
   receiving, via the manufacturer off-lease seller interface, a manufacturer used automobile seller selection of the first bid, wherein the manufacturer used automobile seller selection indicates a manufacturer used automobile seller intention to sell the first used automobile based on the first bid to the first used automobile buyer.

3. The method of claim 1, wherein the first request is made by the used automobile seller using a mobile device which takes a picture of a vehicle identifier, and the vehicle identifier is recognized using optical character recognition.

4. The method of claim 1, wherein the first request is made by the used automobile seller using a mobile device including a microphone, and the vehicle identifier is input via the microphone, and the vehicle identifier is recognized using speech recognition.

5. The method of claim 1, further comprising storing, on a computer readable medium, automobile market data that is representative of recent automobile market characteristics, wherein the automobile market data is based on real-time automobile market data.

6. The method of claim 1, wherein the first request includes a picture of at least one of the exterior of the automobile, the interior of the automobile, the dashboard of the automobile, the odometer of the automobile, service records of the automobile, and ownership records of the automobile.

7. The method of claim 1, further comprising storing, on a computer readable medium, pricing data including used automobile data and new automobile data, including actual prices of executed transactions, dealer listing prices, dealer sale prices, manufacturer incentives, dealer bids, consumer bids, and consumer pricing parameters.

8. The method of claim 1, wherein an add-on, including at least one of insurance, financing, a service contract, a warranty, and a hard-add accessory, is provided by a third party to the first used automobile buyer with the first request, via the used automobile buyer interface, wherein the third party is different from the used automobile seller and the first used automobile buyer.

9. The method of claim 8, wherein the add-on is selected for inclusion in the first bid by the first used automobile buyer.

10. The method of claim 1, further comprising providing second driving directions between the first location and a third location.

11. The method of claim 1, further comprising providing a plurality of pickup locations, each having different driving directions.

12. The method of claim 1, wherein a consumer receives at least one of an insurance policy and a service contract at no charge.

13. The method of claim 1, wherein the first used automobile is an off-lease automobile, and the first location is a dealer in possession of the first used automobile.

14. The method of claim 1, wherein the used automobile seller interface is a manufacturer off-lease seller interface.

15. The method of claim 14, wherein the manufacturer off-lease seller interface includes a number of matches or search hits for the first used automobile.

16. The method of claim 14, wherein a manufacturer user inputs the vehicle identifier into the manufacturer off-lease seller interface by one of typing, speaking, or providing an image of the vehicle identifier.

17. The method of claim 14, wherein the manufacturer off-lease seller interface receives a parameter that the first used automobile will be available for pickup only after a certain date.

18. The method of claim 1, wherein the used automobile seller interface and the used automobile buyer interface are integrated within at least one of a single website and a single application.

19. The method of claim 1, further comprising:
   receiving, via the used automobile buyer interface, a second bid from a second used automobile buyer located at a third location within the in-market used automobile buyer area;
   generating, based on receiving the second bid, second driving directions between the first location and the third location; and
   providing, via the used automobile seller interface, the second bid including at least a second price for the first used automobile and the second driving directions between the first location and the third location.

20. The method of claim 1, wherein the used automobile seller is an original equipment manufacturer.

21. The method of claim 1, wherein the used automobile seller is not an original equipment manufacturer.

22. The method of claim 1, wherein a third party sells a plurality of used automobiles via the used automobile seller interface.

23. The method of claim 22, wherein sales by the third party are made at negotiated prices.

24. The method of claim 22, wherein the used automobile seller interface includes lot inventory of the third party.

25. The method of claim 22, wherein the used automobile buyer interface includes lot inventory of the third party.

26. The method of claim 1, wherein the used automobile seller is a company that operates at least one leasing activity.

27. The method of claim 1, wherein the used automobile seller is a company that operates at least one financing activity.

28. The method of claim 1, wherein the used automobile seller is a captive finance company.

29. The method of claim 1, further comprising, receiving an auction bid from a third party.

30. The method of claim 1, further comprising, providing an auction bid to the used automobile buyer interface.

31. The method of claim 1, wherein the used automobile seller interface and the used automobile buyer interface are provided by at least one webpage.

32. A system comprising:
a computer readable medium storing instructions;
at least one processing device operably coupled to the computer readable medium, the at least one processing device executing the instructions to:
receive, via a used automobile seller interface, a first request for a response regarding a first used automobile, the first request made by a used automobile seller located at a first location and including a vehicle identifier and geolocation information of the first used automobile;
determine, based on the geolocation information, that the first used automobile is located at the first location;
generate, based on the determined first location, an in-market used automobile buyer area;
determine that at least one used automobile buyer is located within the in-market used automobile buyer area;
receive, via a used automobile buyer interface, a first bid from a first used automobile buyer located at a second location within the in-market used automobile buyer area;
generate, based on receiving the first bid, driving directions between the first location and the second location; and
provide, via the used automobile seller interface, the first bid including at least a price for the first used automobile and the driving directions between the first location and the second location.

33. The system of claim 32, wherein the used automobile seller interface is a manufacturer off-lease seller interface, and
wherein the at least one processing device further executes the instructions to:
receive, via the manufacturer off-lease seller interface, a manufacturer used automobile seller selection of the first bid, wherein the manufacturer used automobile seller selection indicates a manufacturer used automobile seller intention to sell the first used automobile based on the first bid to the first used automobile buyer.

34. The system of claim 32, wherein the first request is made by the used automobile seller using a mobile device which takes a picture of a vehicle identifier, and the vehicle identifier is recognized using optical character recognition.

35. The system of claim 32, wherein the first request is made by the used automobile seller using a mobile device including a microphone, and the vehicle identifier is input via the microphone, and the vehicle identifier is recognized using speech recognition.

36. The system of claim 32, wherein the computer readable medium stores automobile market data that is representative of recent automobile market characteristics, wherein the automobile market data is based on real-time automobile market data.

37. The system of claim 32, wherein the first request includes a picture of at least one of the exterior of the automobile, the interior of the automobile, the dashboard of the automobile, the odometer of the automobile, service records of the automobile, and ownership records of the automobile.

38. The system of claim 32, wherein the computer readable medium stores pricing data including used automobile data and new automobile data, including actual prices of executed transactions, dealer listing prices, dealer sale prices, manufacturer incentives, dealer bids, consumer bids, and consumer pricing parameters.

39. The system of claim 32, wherein an add-on, including at least one of insurance, financing, a service contract, a warranty, and a hard-add accessory, is provided by a third party to the first used automobile buyer with the first request, via the used automobile buyer interface, wherein the third party is different from the used automobile seller and the first used automobile buyer.

40. The system of claim 39, wherein the add-on is selected for inclusion in the first bid by the first used automobile buyer.

41. The system of claim 32, wherein second driving directions are provided between the first location and a third location.

42. The system of claim 32, wherein a plurality of pickup locations, each having different driving directions, are provided.

43. The system of claim 32, wherein a consumer receives at least one of an insurance policy and a service contract at no charge.

44. The system of claim 32, wherein the first used automobile is an off-lease automobile, and the first location is a dealer in possession of the first used automobile.

45. The system of claim 32, wherein the used automobile seller interface is a manufacturer off-lease seller interface.

46. The system of claim 45, wherein the manufacturer off-lease seller interface includes a number of matches or search hits for the first used automobile.

47. The system of claim 45, wherein a manufacturer user inputs the vehicle identifier into the manufacturer off-lease seller interface by one of typing, speaking, or providing an image of the vehicle identifier.

48. The system of claim 45, wherein the manufacturer off-lease seller interface receives a parameter that the first used automobile will be available for pickup only after a certain date.

49. The system of claim 32, wherein the used automobile seller interface and the used automobile buyer interface are integrated within at least one of a single website and a single application.

50. The system of claim 32, wherein the at least one processing device further executes the instructions to:
receive, via the used automobile buyer interface, a second bid from a second used automobile buyer located at a third location within the in-market used automobile buyer area;

generate, based on receiving the second bid, second driving directions between the first location and the third location; and provide, via the used automobile seller interface, the second bid including at least a second price for the first used automobile and the second driving directions between the first location and the third location.

51. The system of claim 32, wherein the used automobile seller is an original equipment manufacturer.

52. The system of claim 32, wherein the used automobile seller is not an original equipment manufacturer.

53. The system of claim 32, wherein a third party sells a plurality of used automobiles via the used automobile seller interface.

54. The system of claim 53, wherein sales by the third party are made at negotiated prices.

55. The system of claim 53, wherein the used automobile seller interface includes lot inventory of the third party.

56. The system of claim 53, wherein the used automobile buyer interface includes lot inventory of the third party.

57. The system of claim 32, wherein the used automobile seller is a company that operates at least one leasing activity.

58. The system of claim 32, wherein the used automobile seller is a company that operates at least one financing activity.

59. The system of claim 32, wherein the used automobile seller is a captive finance company.

60. The system of claim 32, wherein an auction bid is received from a third party.

61. The system of claim 32, wherein an auction bid is provided to the used automobile buyer interface.

62. The system of claim 32, wherein the used automobile seller interface and the used automobile buyer interface are provided by at least one webpage.

63. A non-transitory computer readable medium storing instructions which, when executed, are configured to cause an information processing apparatus to:

receive, via a used automobile seller interface, a first request for a response regarding a first used automobile, the first request made by a used automobile seller located at a first location and including a vehicle identifier and geolocation information of the first used automobile;

determine, based on the geolocation information, that the first used automobile is located at the first location;

generate, based on the determined first location, an in-market used automobile buyer area;

determine that at least one used automobile buyer is located within the in-market used automobile buyer area;

receive, via a used automobile buyer interface, a first bid from a first used automobile buyer located at a second location within the in-market used automobile buyer area;

generate, based on receiving the first bid, driving directions between the first location and the second location; and provide, via the used automobile seller interface, the first bid including at least a price for the first used automobile and the driving directions between the first location and the second location.

* * * * *